(12) United States Patent
Epureanu et al.

(10) Patent No.: US 11,391,175 B2
(45) Date of Patent: Jul. 19, 2022

(54) VIBRATION ABSORBER DAMPERS FOR INTEGRALLY BLADED ROTORS AND OTHER CYCLIC SYMMETRIC STRUCTURES

(71) Applicant: THE REGENTS OF THE UNIVERSITY OF MICHIGAN, Ann Arbor, MI (US)

(72) Inventors: Bogdan I. Epureanu, Ann Arbor, MI (US); Andrea Lupini, Ann Arbor, MI (US); Mainak Mitra, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 238 days.

(21) Appl. No.: 16/897,789

(22) Filed: Jun. 10, 2020

(65) Prior Publication Data
US 2020/0392864 A1 Dec. 17, 2020

Related U.S. Application Data

(60) Provisional application No. 62/860,849, filed on Jun. 13, 2019.

(51) Int. Cl.
*F01D 25/06* (2006.01)

(52) U.S. Cl.
CPC .......... *F01D 25/06* (2013.01); *F05D 2240/20* (2013.01); *F05D 2260/96* (2013.01)

(58) Field of Classification Search
CPC ... F01D 25/06; F05D 2240/20; F05D 2260/96
See application file for complete search history.

(56) References Cited

U.S. PATENT DOCUMENTS 6,375,428 B1 * 4/2002 Stangeland ............... F01D 5/10
416/193 A
2011/0243709 A1 10/2011 El-Aini et al.
(Continued)

FOREIGN PATENT DOCUMENTS

CN 112543843 A * 3/2021 ............. B64D 27/16
JP 10-196305 7/1998
(Continued)

OTHER PUBLICATIONS

International Search Report and Written Opinion dated Sep. 24, 2020 regarding International Application No. PCT/US2020/037372.

*Primary Examiner* — Juan G Flores
*Assistant Examiner* — Joshua R Beebe
(74) *Attorney, Agent, or Firm* — Harness, Dickey & Pierce, P.L.C.

(57) ABSTRACT

A vibration absorber damper and method of dissipating vibration energy in a rotatable structure which is nominally cyclic symmetric. The nominally cyclic symmetric structure includes a hub portion having a rotational axis and a plurality of radial members radially extending from the hub portion. The hub portions having a groove extending circumferentially about the rotational axis. The vibrational absorber having a ring member having a plurality of repetitive cellular structures each defining a hollow interior section and a plurality of deformable members each extending from the ring member and disposed in a corresponding one of the repetitive cellular structures. Each of the deformable members is configured to interact with the cyclic symmetric structure to damp vibration thereof.

13 Claims, 31 Drawing Sheets

(56) References Cited

U.S. PATENT DOCUMENTS

| | | | | |
|---|---|---|---|---|
| 2012/0180500 A1* | 7/2012 | DiCintio | ................ | F01D 9/023 |
| | | | | 29/888 |
| 2016/0298458 A1* | 10/2016 | Edwards | ................... | F01D 5/10 |
| 2016/0312800 A1* | 10/2016 | Leslie | ..................... | F01D 25/06 |
| 2017/0321556 A1* | 11/2017 | Pankratov | ................. | F01D 5/10 |
| 2018/0087384 A1* | 3/2018 | Pankratov | ................. | F01D 5/10 |
| 2018/0087397 A1* | 3/2018 | Caprario | .............. | F01D 5/3015 |
| 2019/0186270 A1* | 6/2019 | Joly | ..................... | F04D 29/324 |

FOREIGN PATENT DOCUMENTS

| | | | | |
|---|---|---|---|---|
| JP | 2014-167263 A | | 9/2014 | |
| KR | 2005-0081863 A | | 8/2005 | |
| WO | WO-2014168743 A1 * | | 10/2014 | ........... F01D 11/006 |

* cited by examiner

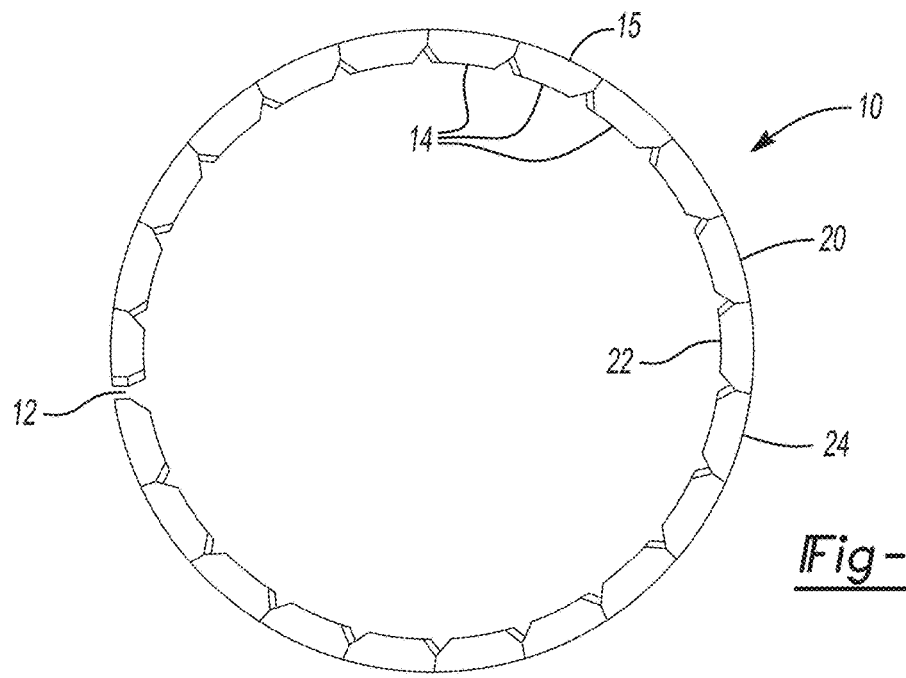
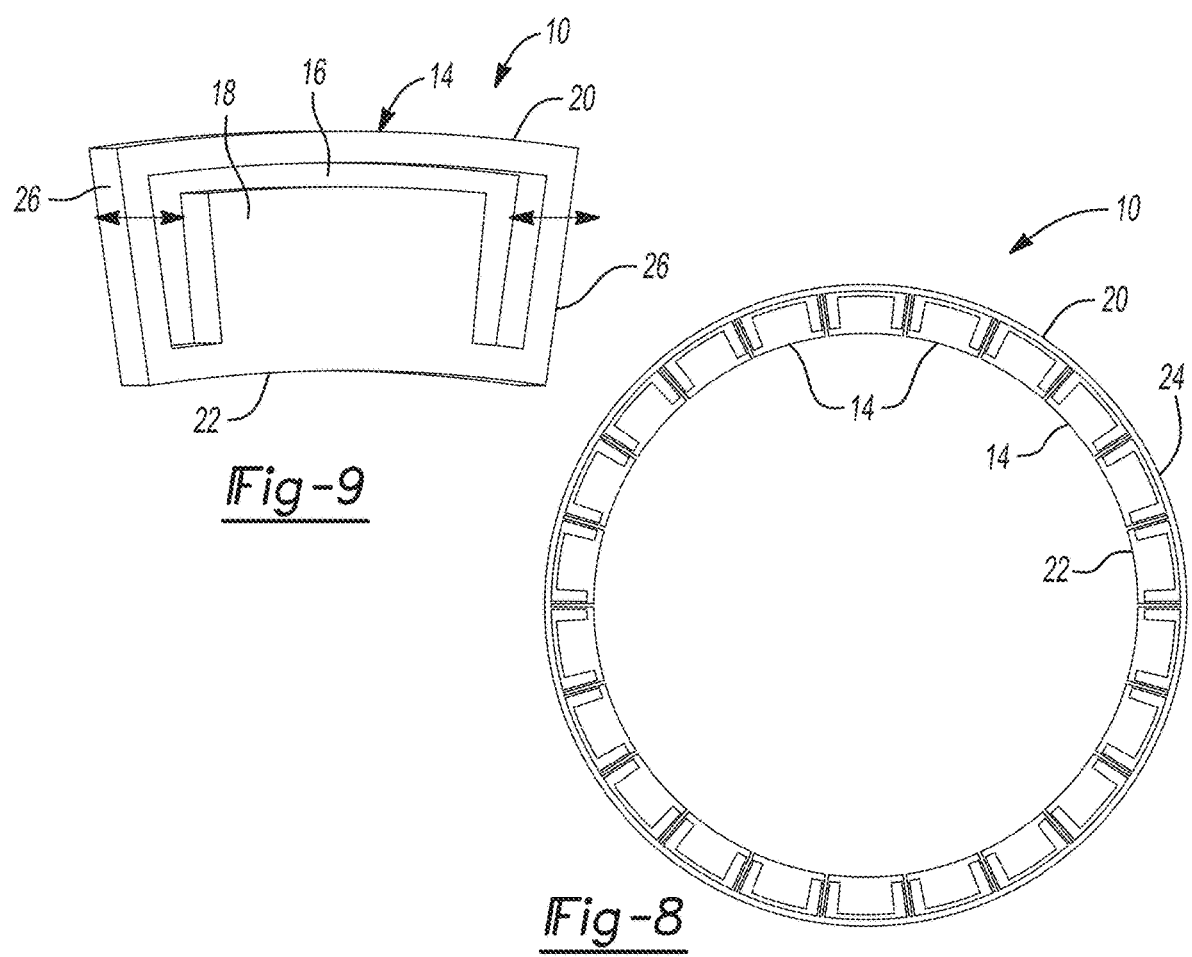

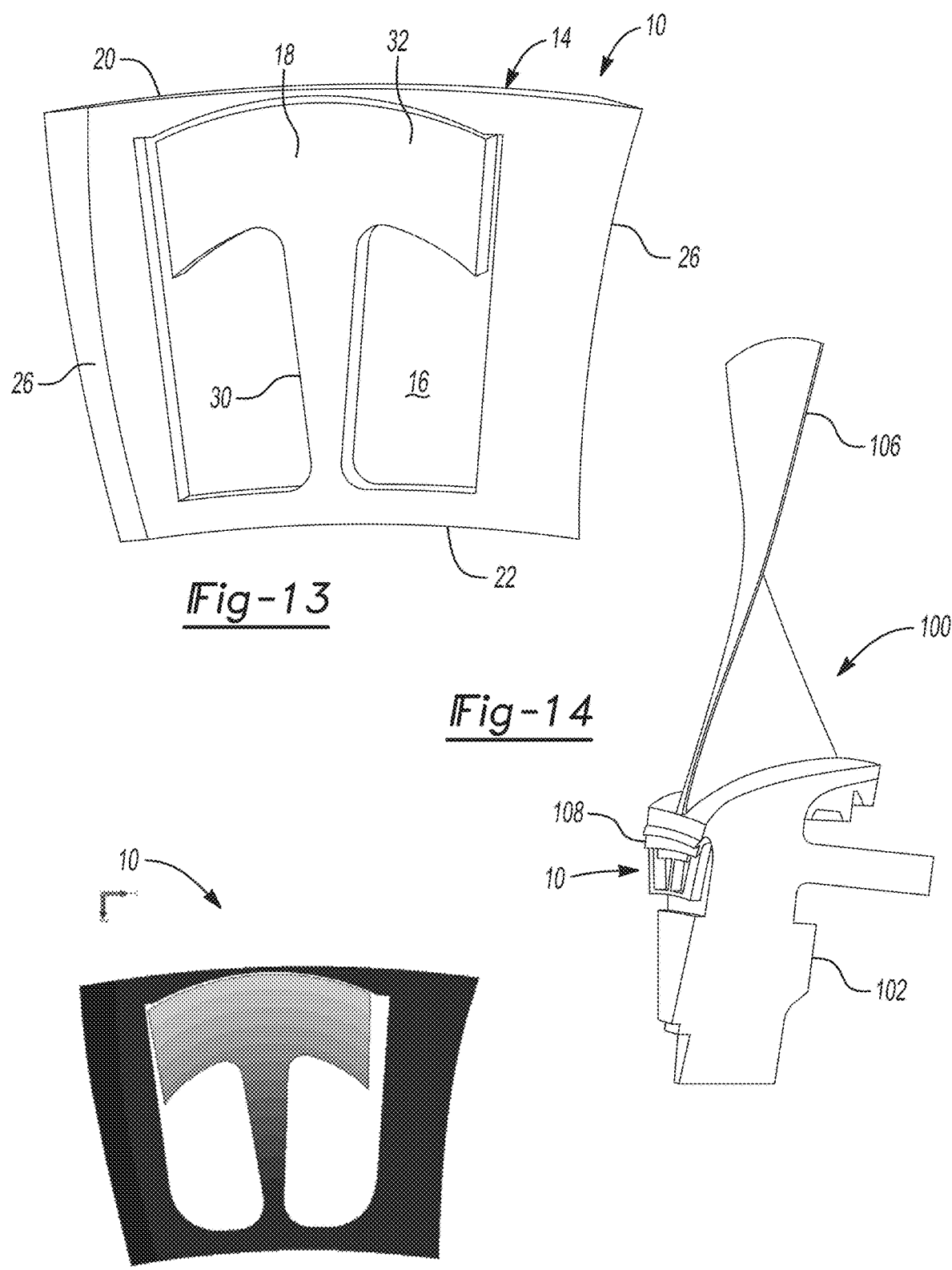

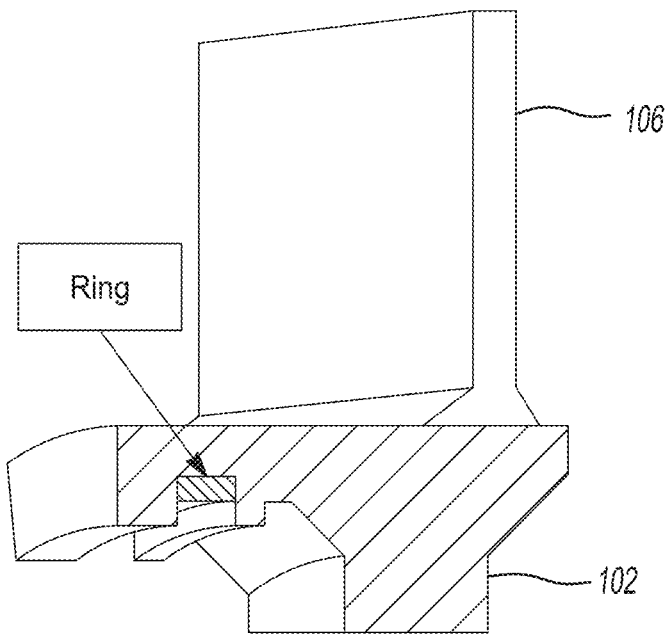
Fig-26
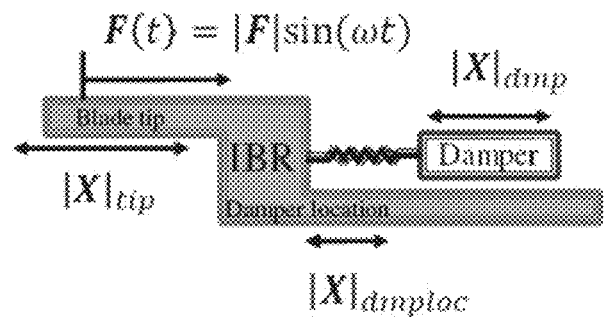
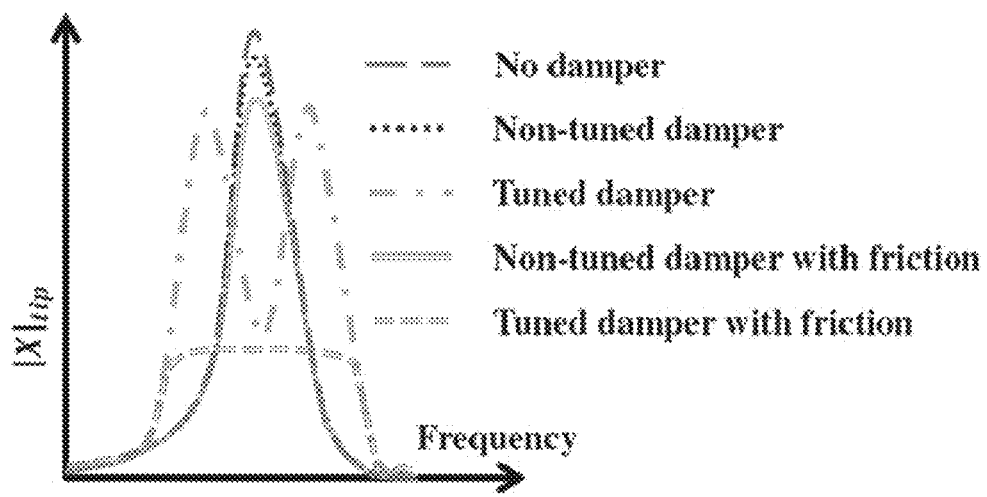
Fig-27

| Parameter | Value | Parameter | Value |
|---|---|---|---|
| $m_{b2}$ | $3 \times 10^{-2}$ kg | $k_{y1}$ | $1 \times 10^9$ N/m |
| $m_{b1}$ | $3 \times 10^{-1}$ kg | $k_{s2}$ | $4.36 \times 10^6$ N/m |
| $m_{r1}$ | 10 kg | $k_{c1}$ | $4.36 \times 10^6$ N/m |
| $m_{d1}$ | $3 \times 10^{-2}$ kg | $k_{d1}$ | $4.36 \times 10^6$ N/m |
| $m_{d2}$ | $3 \times 10^{-2}$ kg | $\beta_b$ | $1 \times 10^{-7}$ Ns/m |
| $k_{b1}$ | $10^6$ N/m | $\beta_c$ | $1 \times 10^{-7}$ Ns/m |
| $k_{i1}$ | $5 \times 10^6$ N/m | $\beta_d$ | $1 \times 10^{-7}$ Ns/m |
| $k_{g1}$ | $6 \times 10^4$ N/m | | |

VIBRATION ABSORBER DAMPERS FOR INTEGRALLY BLADED ROTORS AND OTHER CYCLIC SYMMETRIC STRUCTURES

CROSS-REFERENCE TO RELATED APPLICATIONS

This application claims the benefit of U.S. Provisional Application No. 62/860,849, filed Jun. 13, 2019. The entire disclosure of the above application is incorporated herein by reference.

FIELD

The present disclosure relates to a vibration absorber dampers for integrally bladed rotors and other cyclic symmetric structures.

BACKGROUND AND SUMMARY

This section provides background information related to the present disclosure which is not necessarily prior art. This section provides a general summary of the disclosure, and is not a comprehensive disclosure of its full scope or all of its features.

Vibration suppression is of paramount importance in turbomachinery components. This is particularly true for elements such as integrally bladed rotors also called IBRs, which are manufactured in one piece, and thus have very small damping. For this reason, several techniques have been proposed, such as the usage of coatings and ring dampers. However, these techniques have limited effectiveness.

In order to increase the damping effectiveness, the concept of a vibration absorber is applied to turbomachinery components. The key idea is to exploit resonance of the damper component to induce dissipation through friction, increasing effectiveness. Also, the shape can play an important role. This design includes, but is not limited to: ring dampers, under platform dampers, and any form of damping mechanism with the added feature of vibration tunability for increased effectiveness. In addition to that, geometric variations to increase the aforementioned effects are covered, including but not limited to: lobed geometry, presence of protrusions, local presence of different materials, etc. Preliminary simulations have shown great potential for this design.

Generally speaking, tuned vibration absorbers have been widely used in a variety of mechanical applications to reduce forced responses of structures, such as buildings, power lines, bridges and spacecraft in part because the size and mass of such absorbers are much smaller than the structure being damped. In contrast to classical energy dissipation mechanisms such as friction or impact dampers, absorbers represent an energy redirection mechanism, where the energy is transferred away from critical components into the absorber, whose vibration amplitude grows at the original resonance frequency. Once energy is transferred to the absorber, it may be dissipated by various means. To achieve the transfer of energy, absorbers must be tuned, i.e. designed to have natural frequency close to the one being excited, for maximal effectiveness at well-characterized steady-state operational regimes, which include excitations with comparatively narrow frequency bandwidths. The tuning of the damper can be achieved by optimizing its design parameters through material selection or geometric design. Vibration absorbers applied to multi-degree of freedom systems and multiple absorbers applied to the same structure have been analyzed in the past. Absorbers that incorporate nonlinearities have been studied as well. The robustness of the tuning of these absorbers has also been analyzed. The characteristics of tuned vibration absorbers make them excellent candidates for consideration in the design of damping mechanisms for bladed disks (IBRs), whose cyclic structure and travelling-wave excitation regime create narrow frequency ranges of interest. While order-tuned vibration absorbers that employ parametric resonance concepts have been studied in cyclic symmetric systems before, the implementation of friction enhanced tuned vibration absorber concept remains largely unexplored for such systems.

IBRs are typically cyclically symmetric by design; however, due to manufacturing tolerances, damage, repairs, etc., the symmetry is broken in the real system. Any deviation from cyclic symmetry caused by variation in geometry or properties across blades or sectors is called mistuning, and research has shown that mistuning has a significant effect on the vibratory behavior of the system, causing vibration localization. IBRs may be subjected to high levels of vibration due to low damping and unintentional mistuning. The low damping is due to the absence of frictional joints at the blade-disk interface, which are present in conventional turbomachinery rotors. The blades of an IBR are the most vulnerable to such vibrations, which can result in high cycle fatigue and ultimately blade failure. Hence, the reduction of vibration amplitudes through an effective damping mechanism is of paramount importance.

Several damping solutions have been employed in the past, including the use of coatings, order-tuned vibration absorbers, and impulse mistuning. Another common approach is to use frictional contacts to dissipate energy. Typical examples are the use of shrouds and snubbers. Examples also include under-platform and ring dampers, which add nonlinear damping to the system by means of frictional dissipation. The effectiveness of current damping solutions for IBRs is low for the case of blade dominated modes, which are often the ones most critically affected by mistuning. In the case of ring dampers, energy dissipation and amplitude reduction occur when there is relative motion at the interface between the ring damper and the IBR. This relative motion can be difficult to obtain because the motion is typically largest in the blades, and dampers must be placed away from the blade root to avoid stress concentrations, typically in areas with small motions. Consequently, the damper effectiveness is limited, and only modes with substantial disk participation can be targeted and damped effectively. In addition, another challenge associated with friction dampers is to ensure damper effectiveness across multiple operation regimes and frequency ranges.

A concept that has been exploited in the past for the suppression of vibrations in civil and mechanical structures is the one of tuned vibration absorbers. Tuned vibration absorbers do not typically rely on nonlinearities, and do not require large motion at the attachment location to be effective. The effectiveness of this concept is based on the energy transfer and the frequency split that are achieved through tuning. The split in natural frequency shifts the resonance of the host structure away from the area of interest, resulting in lower amplitude response at the original frequency.

In accordance with the present teachings, a ring damper concept for vibration reduction in nominally cyclic structures, such as bladed disks, is provided. The principles presented here combines the working principles of vibration absorbers and ring dampers to increase damper effectiveness. Nonlinear dissipation is enabled by the increase in damper motion due to tuning. This reduces the need to position the damper in a location with high relative motion between the damper and the IBR, i.e. the damper groove, because a large damper motion is ensured by damper tuning. As a result, the damper is effective for higher mode families and nodal diameters, which are characterized by blade dominated motion and are traditionally more difficult to dampen using ring dampers.

A realistic geometrically mistuned damper is used in the case study presented here to introduce the effects of mistuning in addition to nonlinearities. The ring damper geometry and material are chosen such that the structure presents the same natural frequency of the targeted IBR mode that is damped. The forced response obtained using a tuned vibration absorber is compared to the response obtained when an equivalent non-tuned damper is used, which is used as a baseline for comparison. A substantial amplitude reduction is achieved by means of frictional dissipation by introducing the tuning concept. The effects of variations in tuned vibration absorber frequencies and nonlinear energy dissipation are disclosed herein. It is found that energy dissipation can change based on whether there is a perfect match between the IBR and the damper frequencies or there is a small difference. However, in all the examined cases, the damper effectiveness is increased compared to the baseline.

Finally, the present disclosure presents a study on the applicability of damping mechanisms based on vibration absorption to nominally cyclic symmetric structures such as IBRs. First, the classical single-DOF tuned vibration absorber concept is reviewed. Then, a lumped mass model (LMM) of a cyclic structure representing an IBR attached to a damper is introduced and examined. Classical tuning concepts are extended to this cyclic symmetric multi-DOF system, and the damper is tuned to act as a vibration absorber. Tuning of the damper is achieved by changing structural parameters of the damper such that one of its constrained natural frequencies matches a targeted natural frequency of the IBR-alone mode at the same nodal diameter (ND). It is found that this damper is not effective when its modes and targeted IBR-alone modes do not have the same ND. Once an appropriately tuned damper is attached to the IBR, the response of the combined structure is attenuated at the targeted frequency, and two new resonances appear. Such splitting of natural frequencies is typical of vibration absorbers. The effect of this frequency split on responses at the blade and the damper is studied. The sensitivity of the system to controllable parameters is analyzed. Parameters include the linear proportional damping in the damper and the stiffness of the connection between the IBR and damper. The effect of tuning the damper to the incorrect frequency and altering the location of its connection to the IBR are important. Mistuning is introduced into both the blades and the damper to enable the evaluation of the most important trends and key factors for successful and robust tuning of the vibration absorption based damper. This invention uses simplified models and parametric analysis to show that a vibration absorption based mechanism is a feasible option when developing damping concepts for cyclic symmetric structures such as an IBR. A realization of such a design concept, which uses a tuned vibration absorption concept to leverage additional energy dissipation through frictional damping is presented.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 7 illustrates the vibration absorber according to the present teachings with portions of the invention not shown.

FIG. 8 illustrates the vibration absorber according to the present teachings.

FIG. 9 illustrates a cellular structure of the vibration absorber according to some embodiments of the present teachings.

FIG. 13 illustrates a cellular structure of the vibration absorber according to some embodiments of the present teachings.

FIG. 14 illustrates a cross-sectional view of the IBR with the vibration absorber disposed in the groove of the hub portion.

FIG. 15 illustrates a sample motion of a cellular structure of the vibration absorber according to some embodiments of the present teachings.

FIG. 26 illustrates an IBR.

FIG. 27 qualitatively illustrates a non-tuned damped response, a tuned damped response, and a tuned damped with friction dissipation response to a vibrational force.

Figure 28:
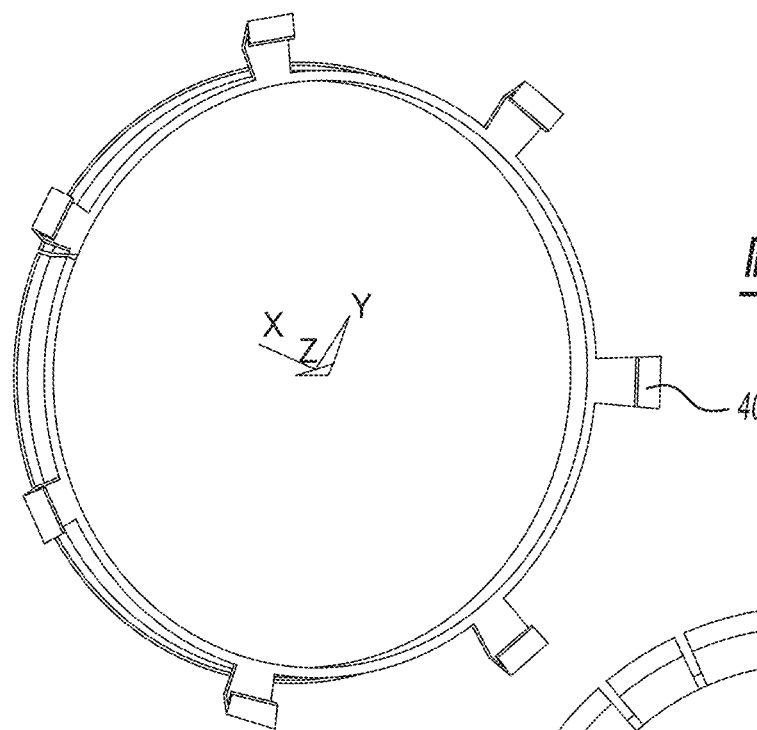
Figure 29:
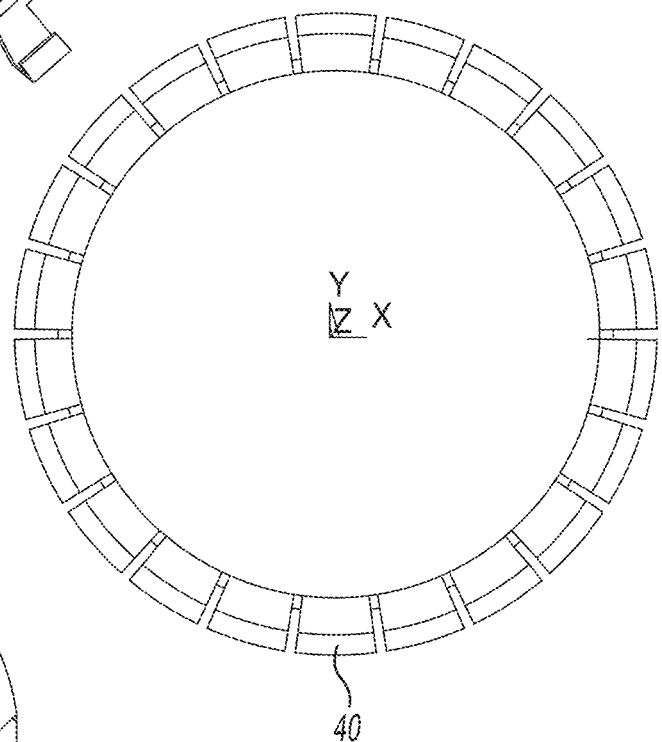
Figure 30:
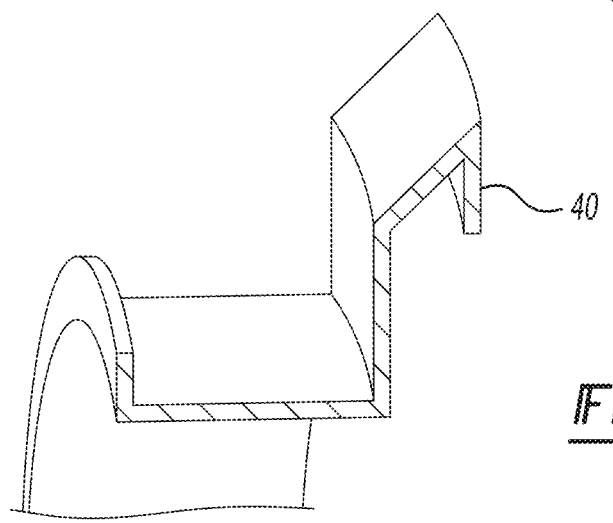

FIGS. 28-30 illustrate frictional fingers.

Figure 31:
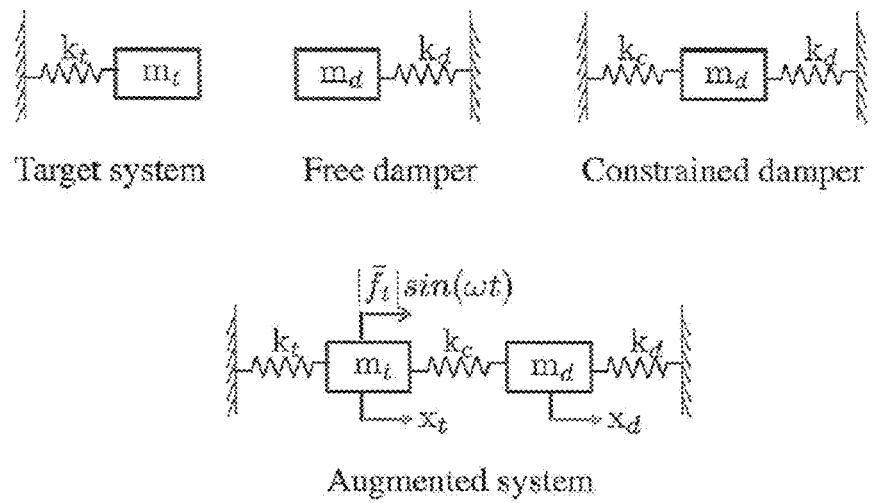

FIG. 31 illustrates the vibration absorber concept.

Figure 32:
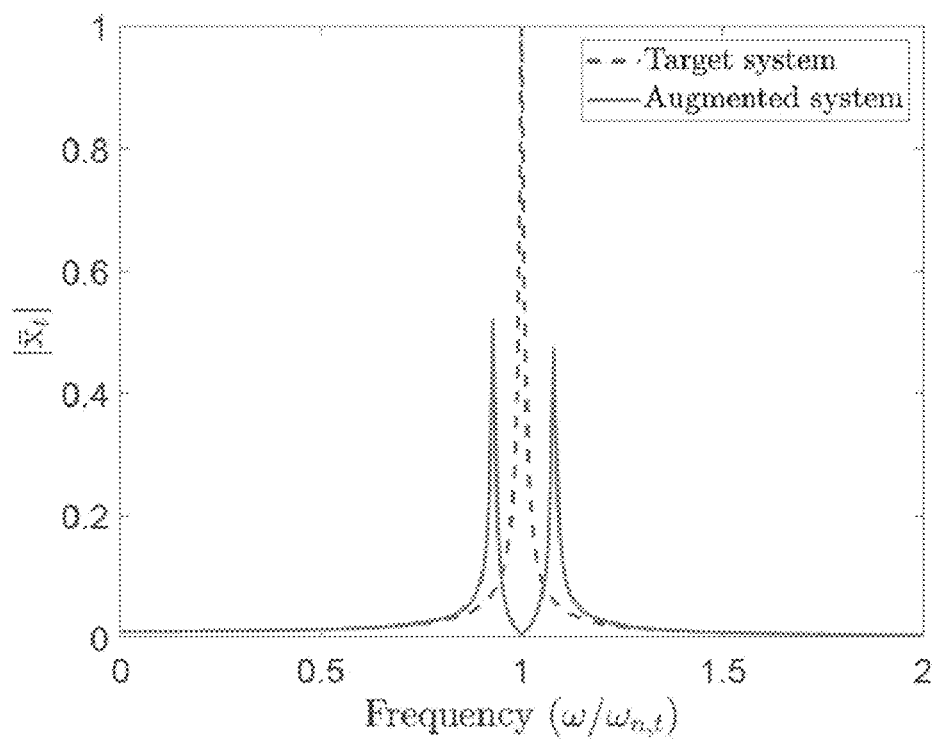

FIG. 32 illustrates responses of targeted and augmented systems.

Figures 33, 34:
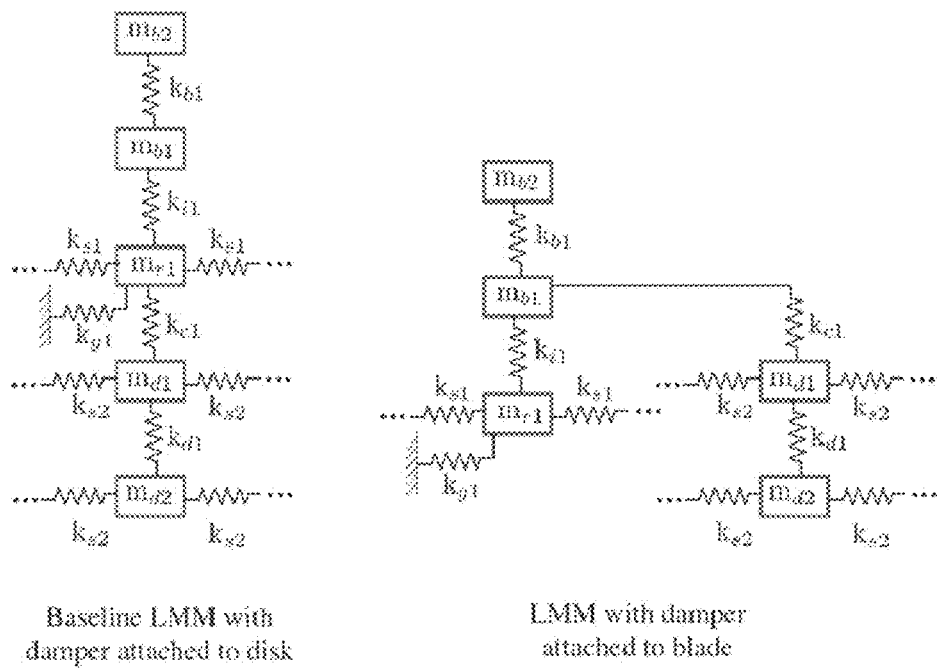

FIG. 33 illustrates lumped mass models (LMMs).

FIG. 34 is a table of nominal parameters for LMMs.

Figure 35:
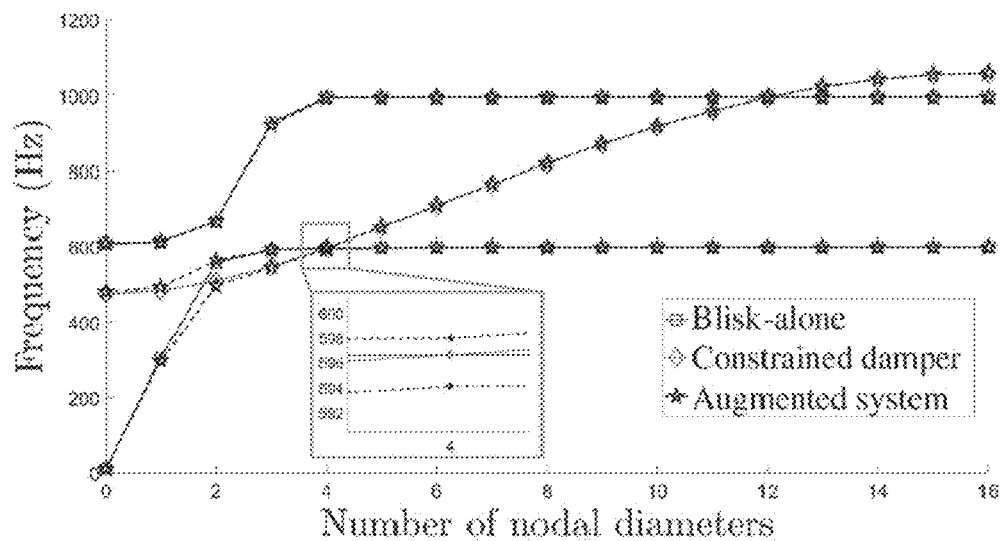

FIG. 35 is a graph illustrating frequency vs number of nodal diameters for baseline LLMs.

Figure 36:
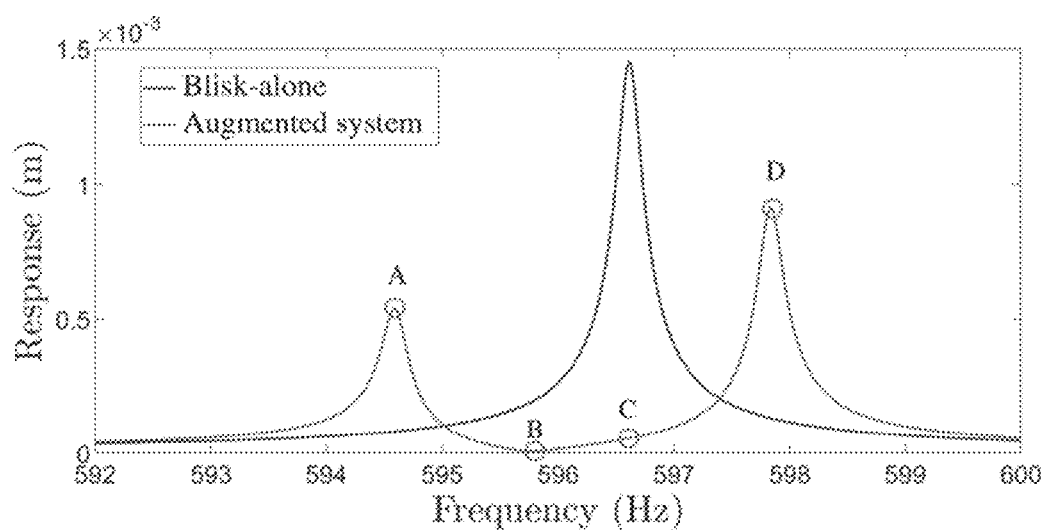
Figure 37A:
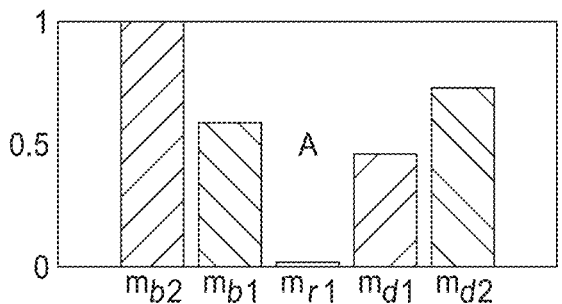
Figure 37B:
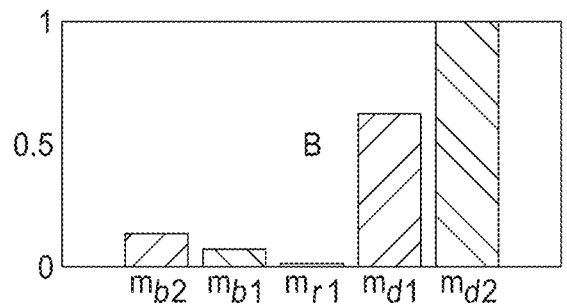
Figure 37C:
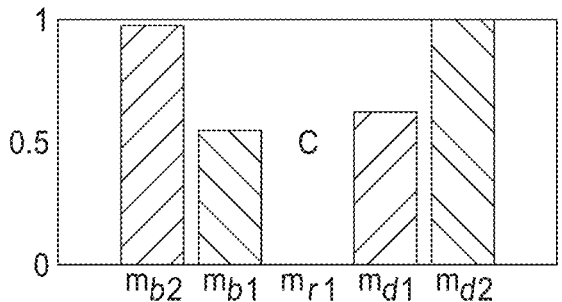
Figure 37D:
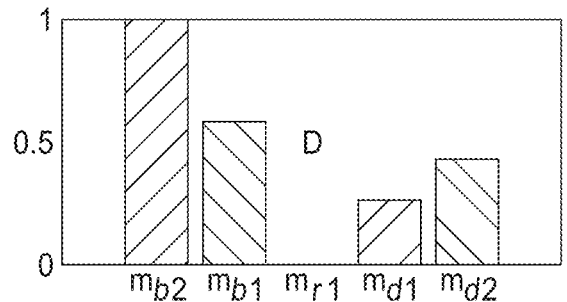

FIG. 36 is a graph illustrating response to EO 4 excitation for tuned baseline LMM.

FIGS. 37A-37D illustrate spatial variations in response amplitudes of tuned baseline LMM.

Figure 38:
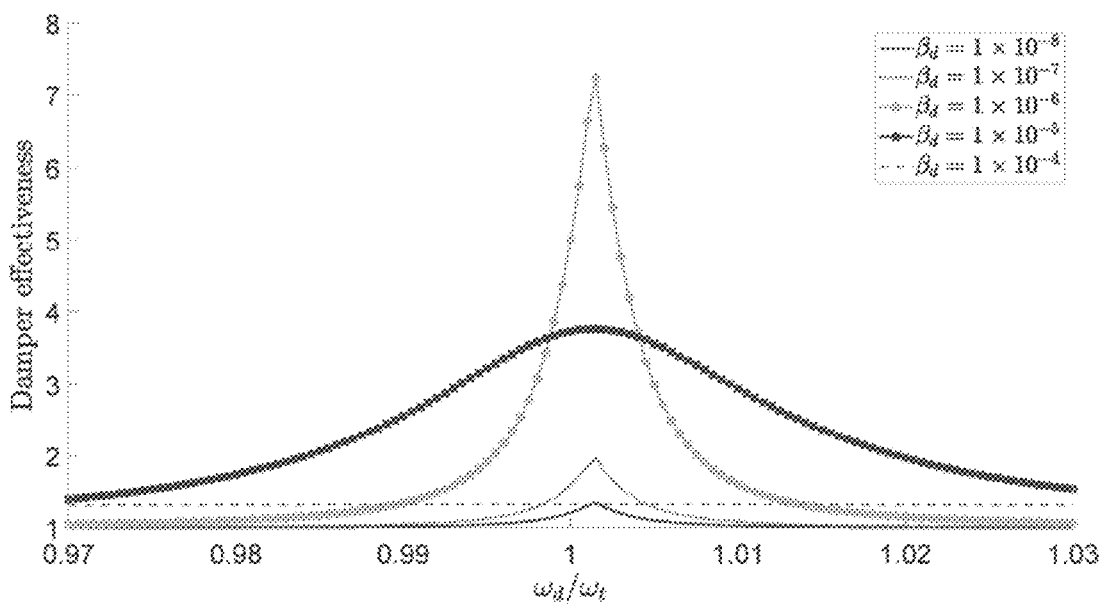

FIG. 38 is a graph illustrating the effect of variation of proportional damping in damper on the damper effectiveness.

Figure 39:
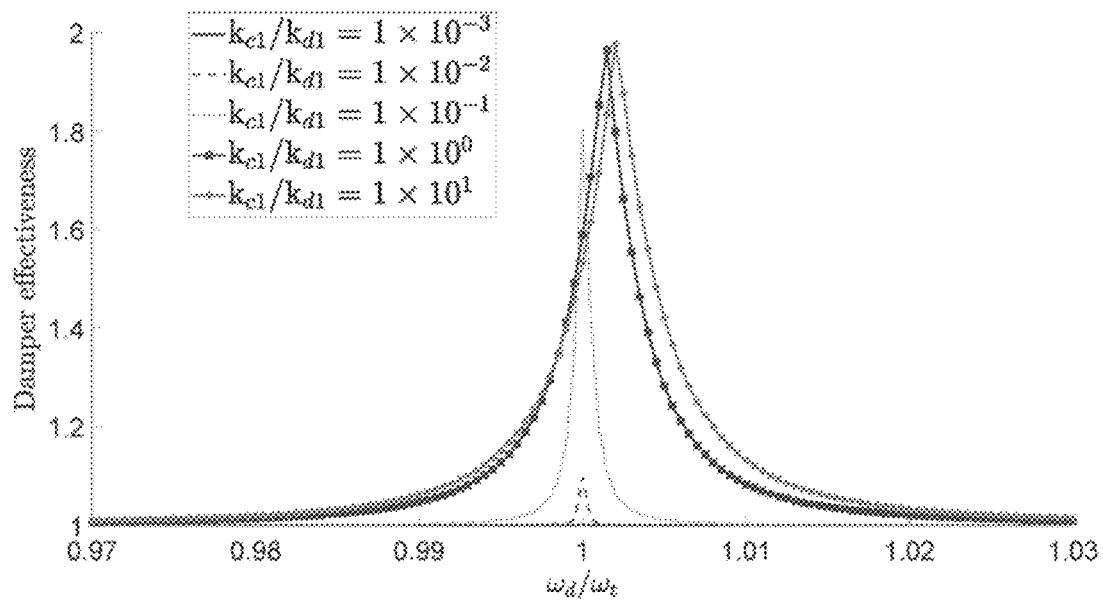

FIG. 39 is a graph illustrating the effect of variation of connection stiffness on damper effectiveness.

Figure 40:
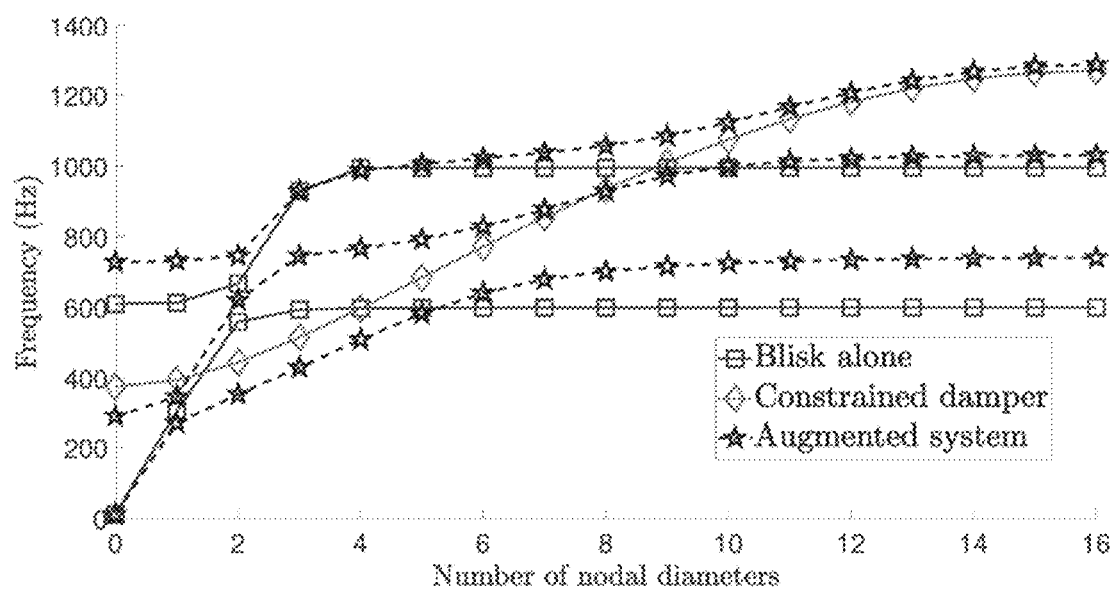

FIG. 40 is a graph illustrating frequency versus number of nodal diameters for LMM with damper attached to blades.

Figure 41:
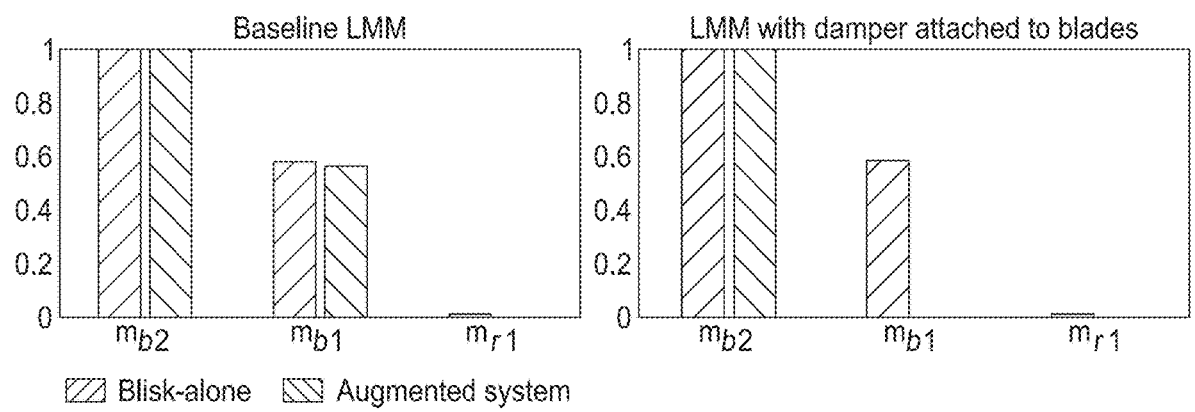

FIG. 41 is a graph illustrating normalized response amplitudes at IBR DOFs near targeted frequency.

Figure 42:
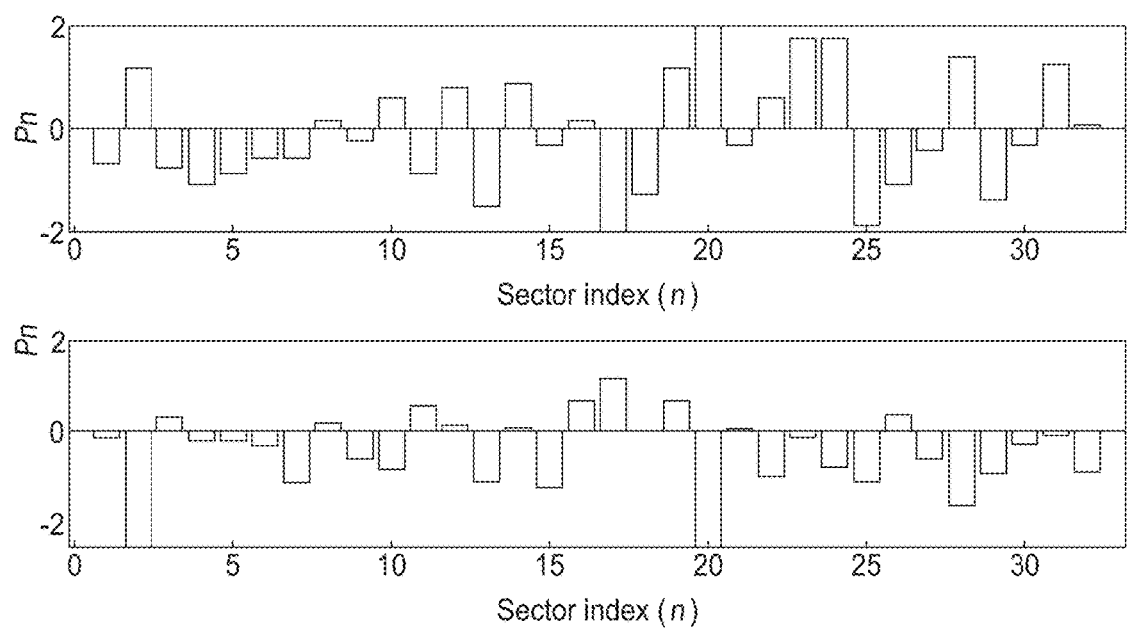

FIG. 42 illustrates mistuning patterns.

Figure 43:
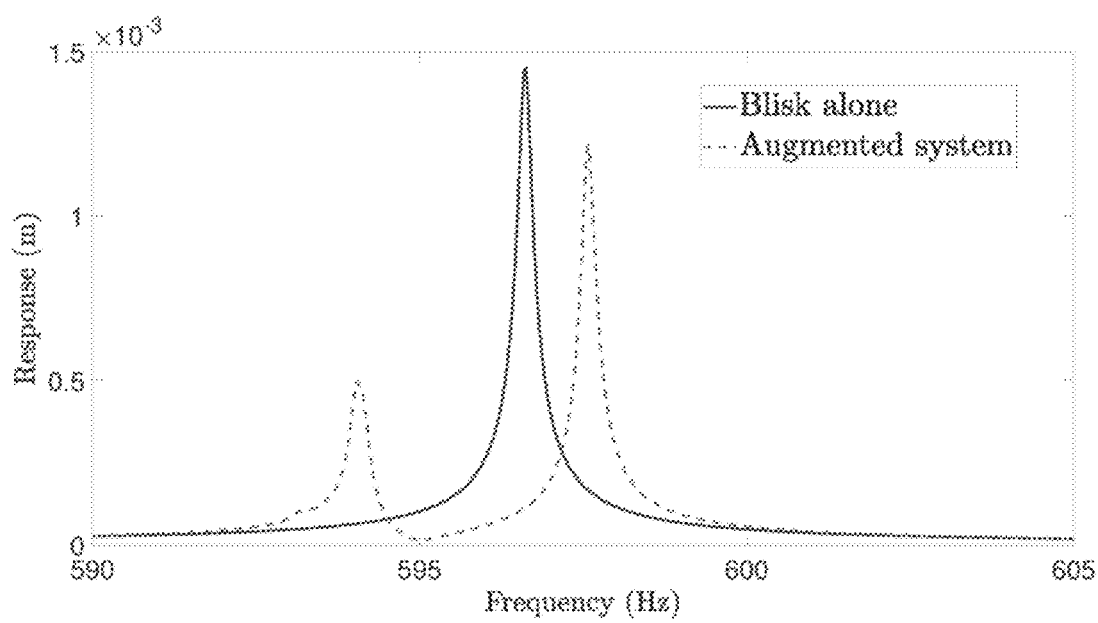

FIG. 43 is a graph illustrating blade response for tuned IBR attached to a mistuned damper (5% standard deviation).

Figure 44:
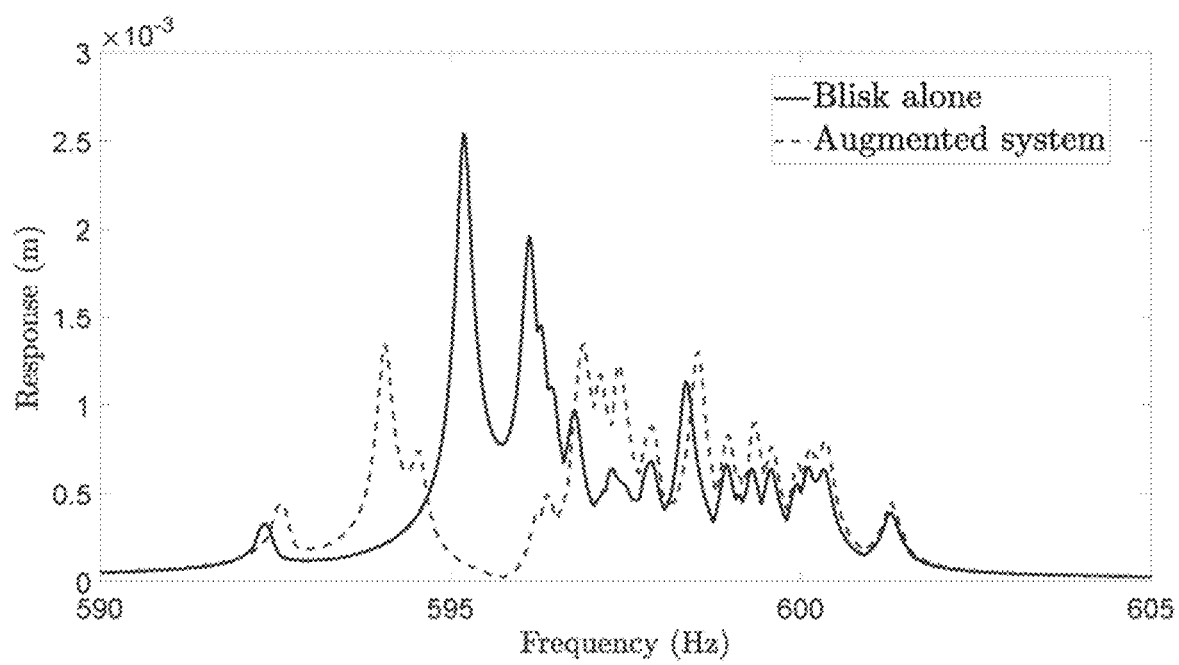

FIG. 44 is a graph illustrating blade response for mistuned IBR (5% standard deviation) attached to the tuned damper.

Figure 45:
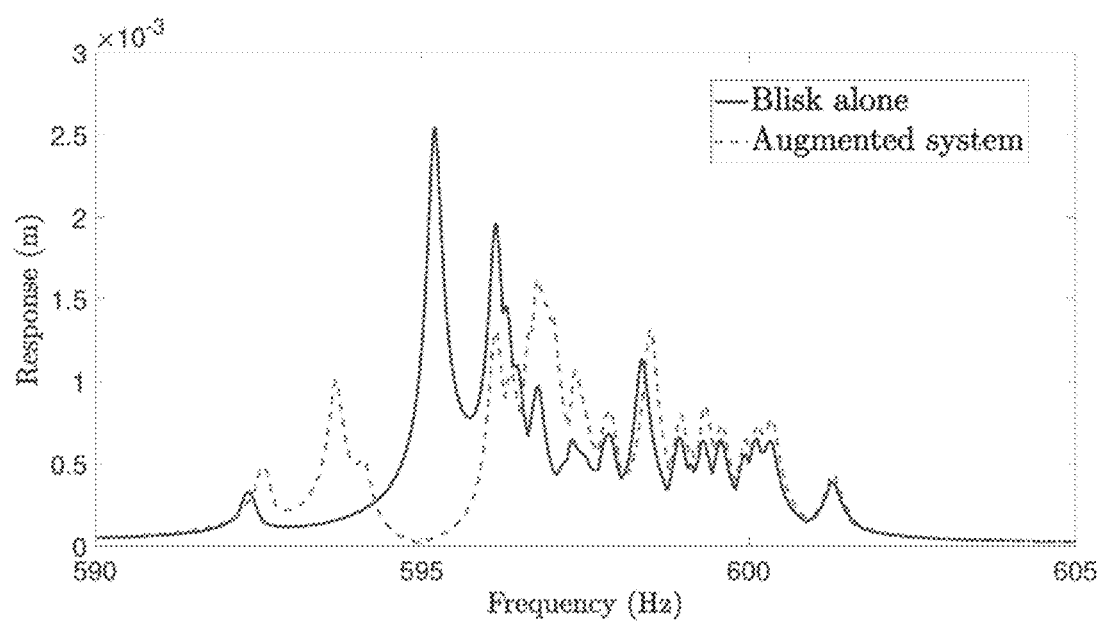

FIG. 45 is a graph illustrating blade response for mistuned IBR attached to a mistuned damper (5% standard deviation).

Figure 46:
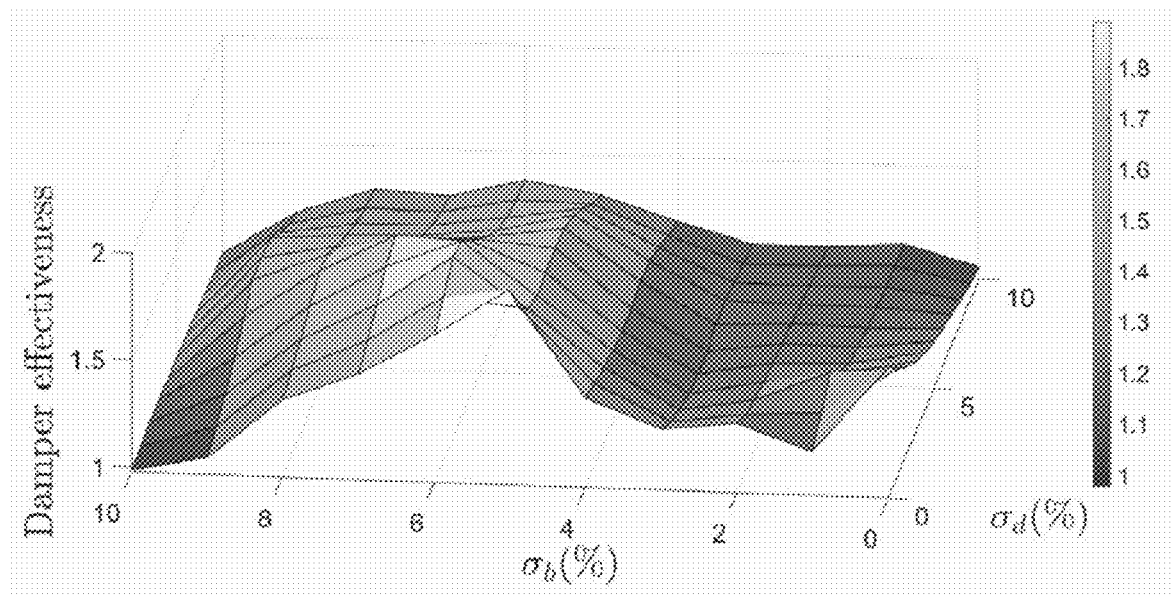

FIG. 46 is a variation of damper effectiveness with mistuning in blades (pattern I) and dampers (pattern II).

Figure 47:
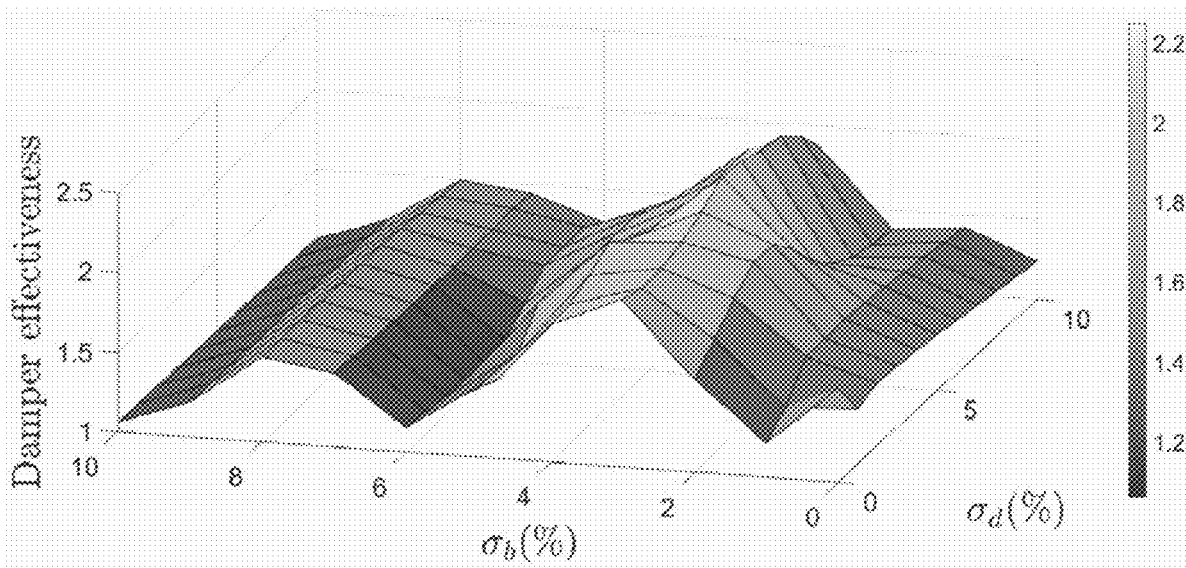

FIG. 47 is a variation of damper effectiveness with mistuning in blades (pattern II) and dampers (pattern I).

Figure 48:
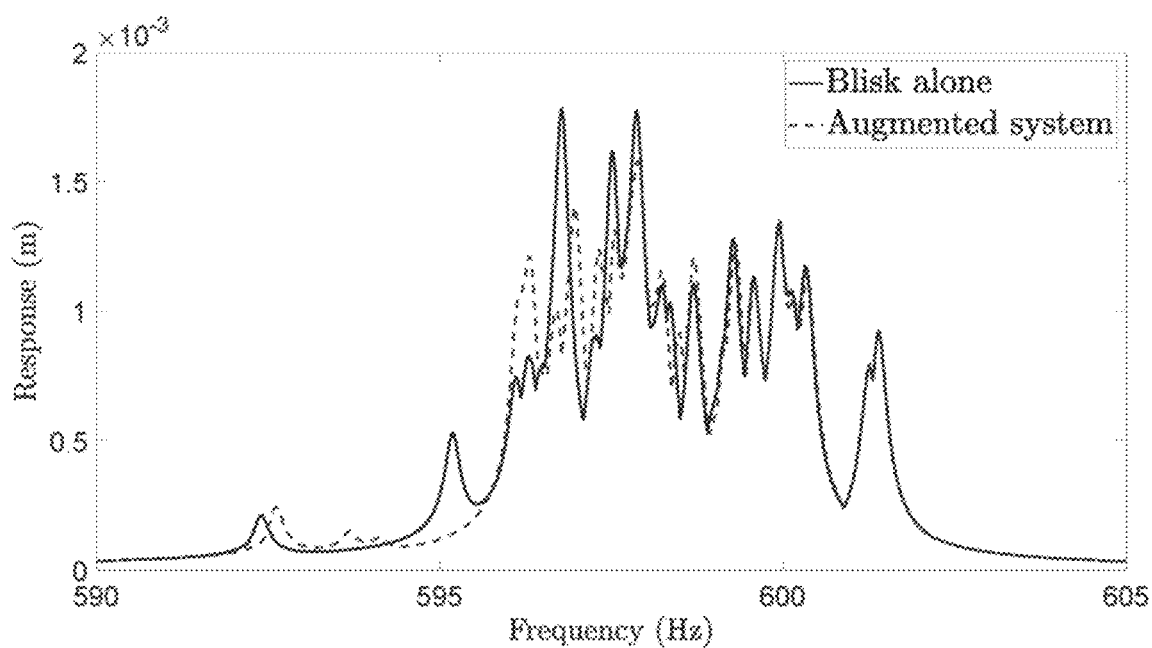

FIG. 48 is a graph illustrating mistuned response to EO 7 excitation.

Figure 49:
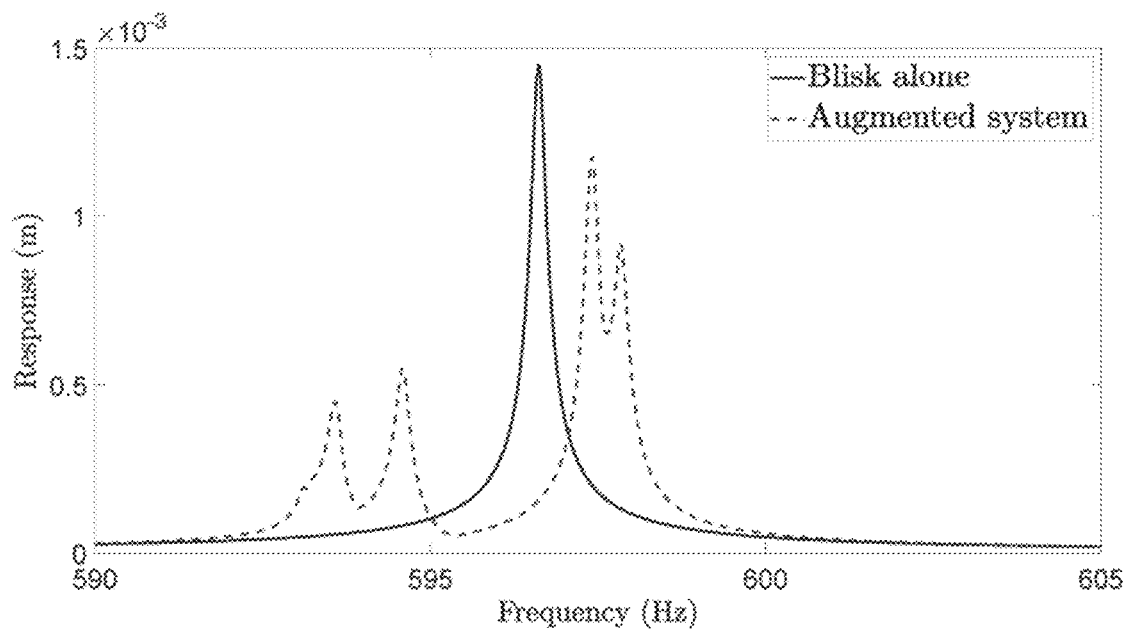

FIG. 49 is a graph illustrating a response of IBR with a damper that has large mistuning in a single sector.

Figure 50:
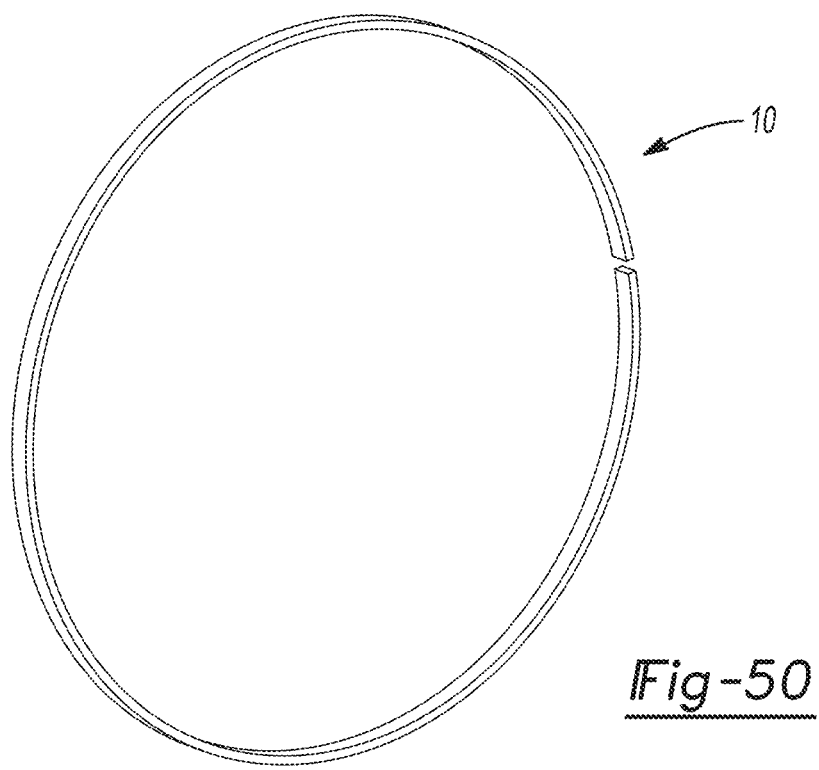

FIG. 50 is a geometry of a ring damper used in the analysis.

Figure 51:
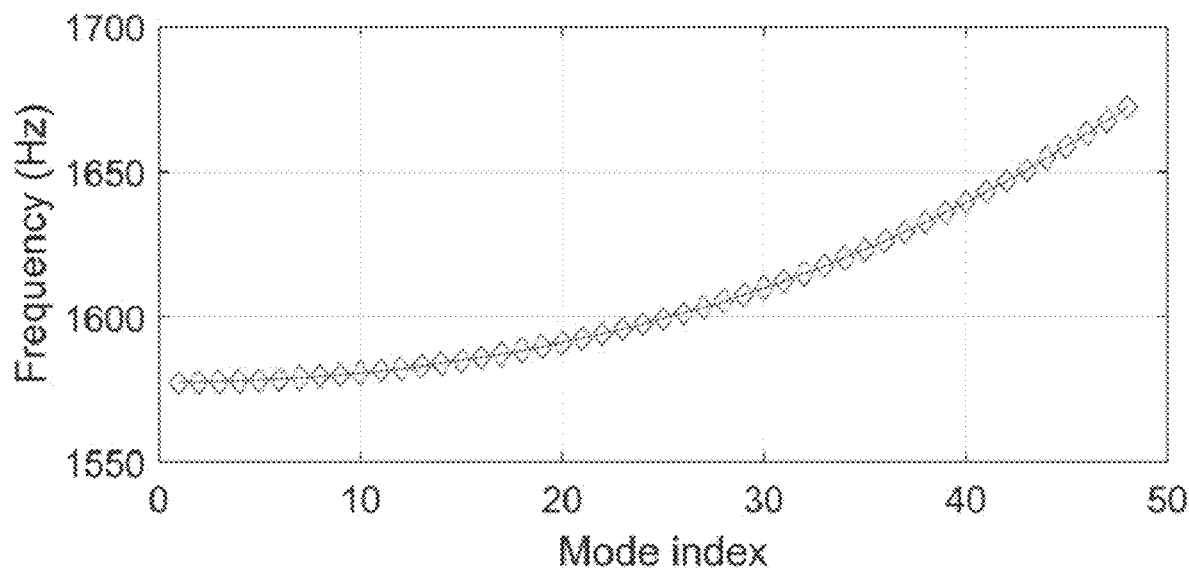

FIG. 51 is a graph illustrating frequency versus mode index plot for the non-tuned damper.

Figure 52:
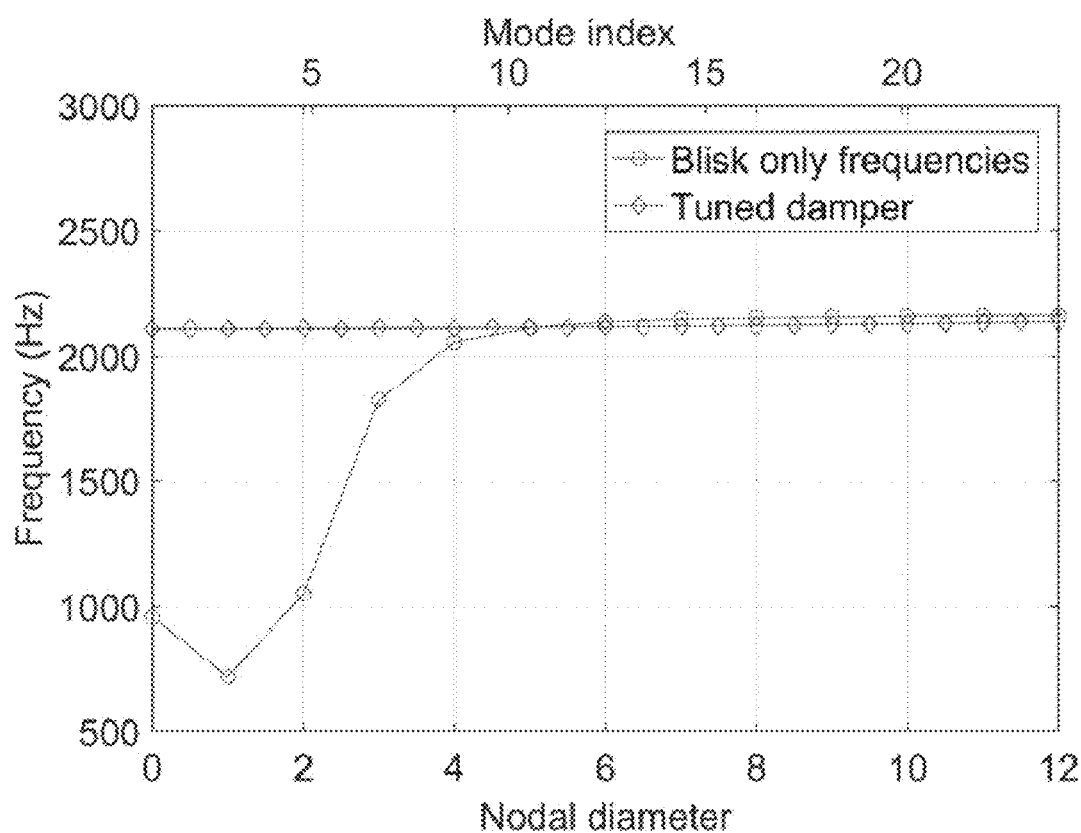

FIG. 52 is a graph illustrating frequency versus nodal diameter plot for the IBR and frequency versus mode index plot for the tuned damper.

Figure 53:
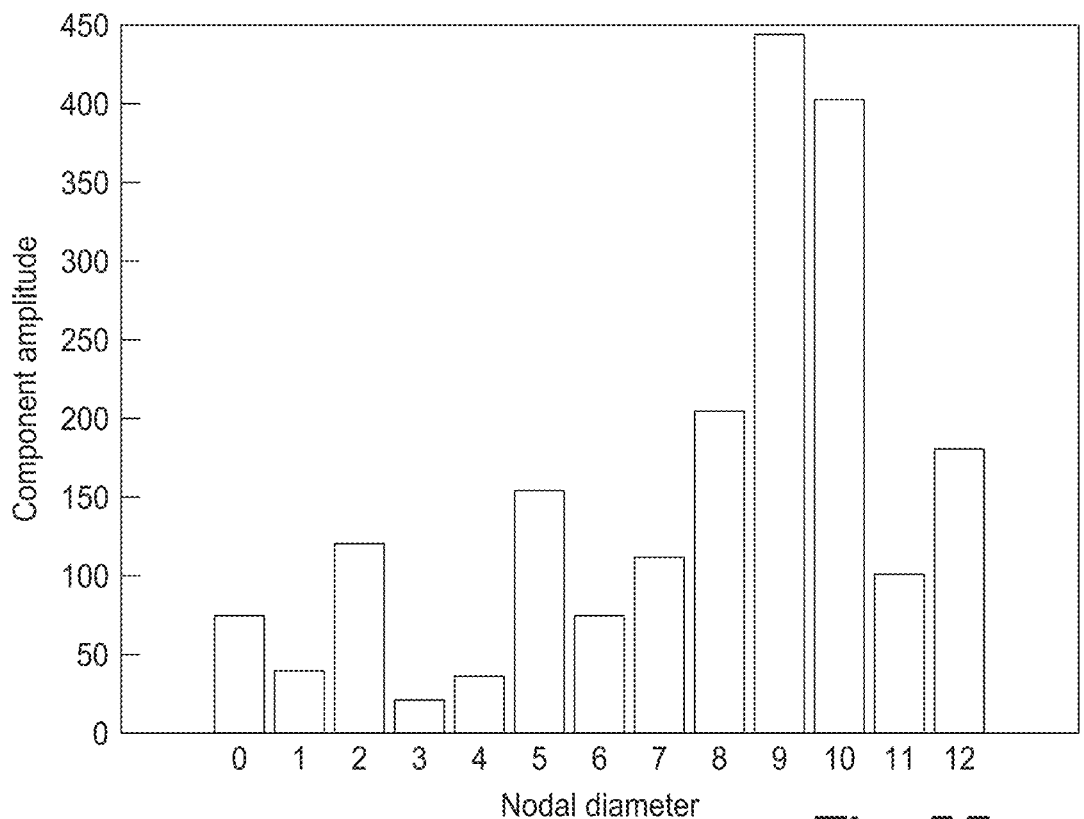

FIG. 53 is a graph illustrating nodal diameter content of the damper mode used to damp an IBR mode having ND=5.

Figure 54:
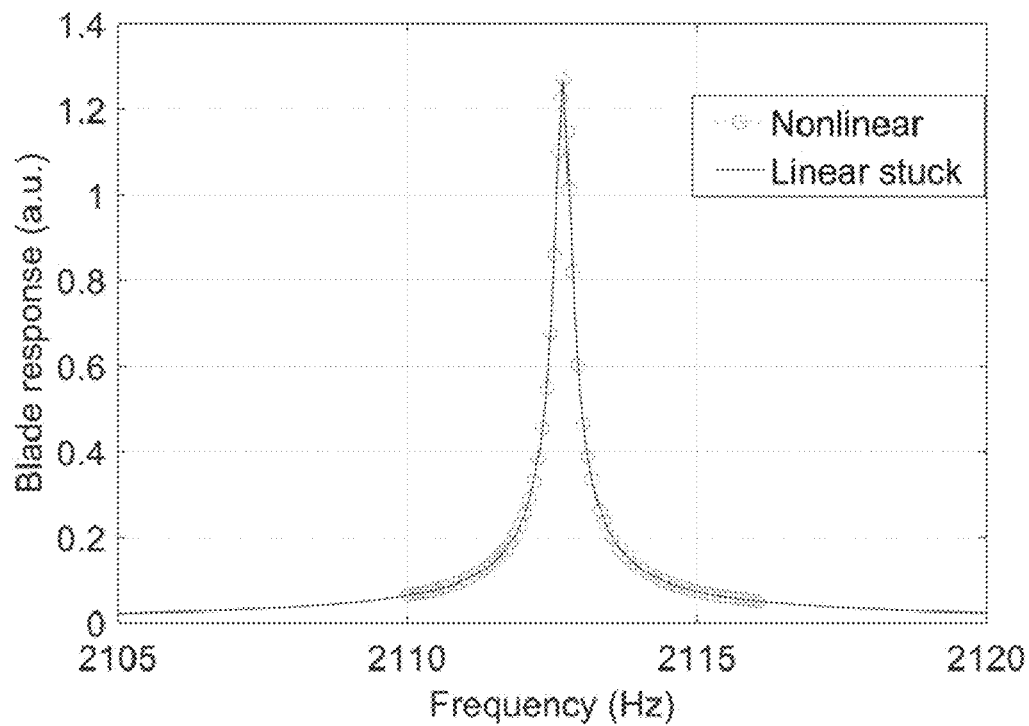

FIG. 54 is a graph illustrating linear and nonlinear analyses of the forced response of a system employing a non-tuned ring damper.

Figure 55:
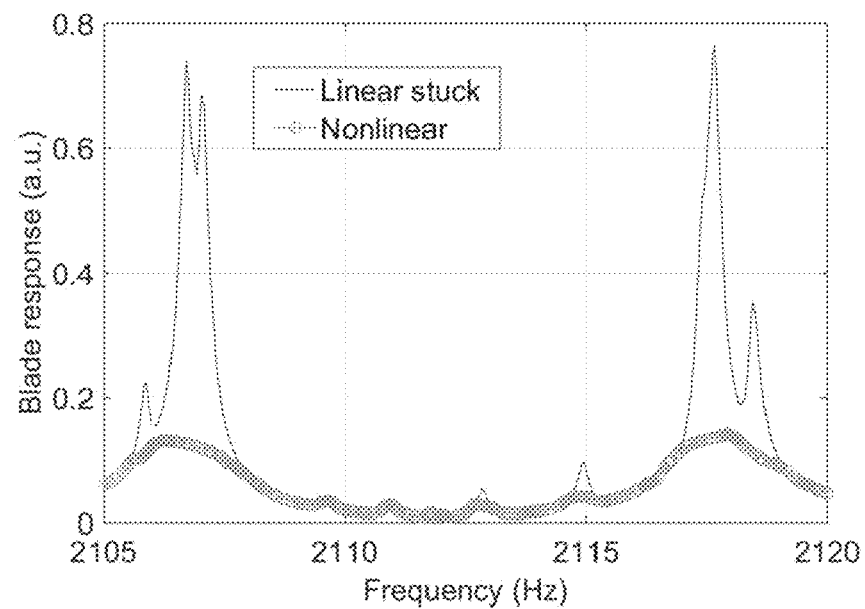

FIG. 55 is a graph illustrating linear and nonlinear analyses of the forced response of a system employing a tuned ring damper.

Figure 56:
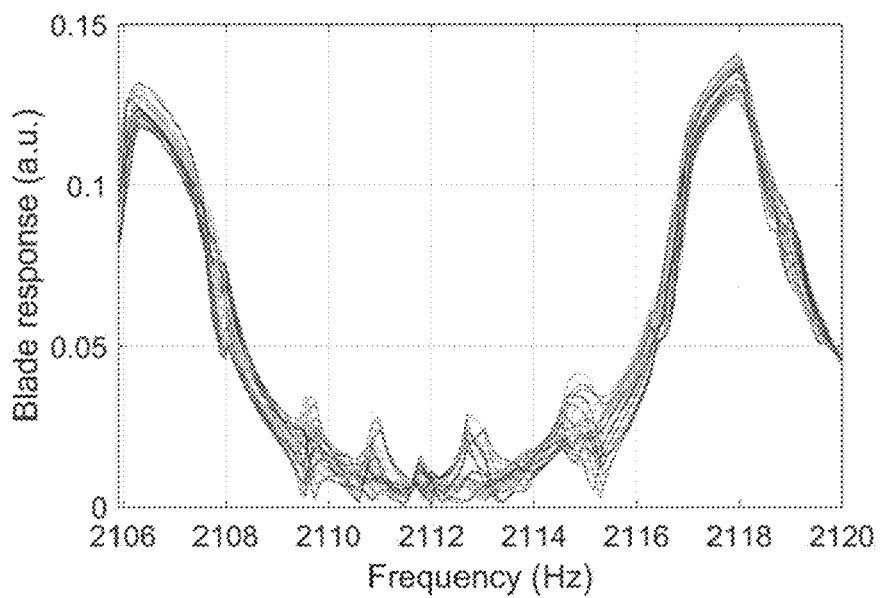

FIG. 56 is a graph illustrating individual blade responses for the nonlinear case shown in FIG. 55.

Figure 57:
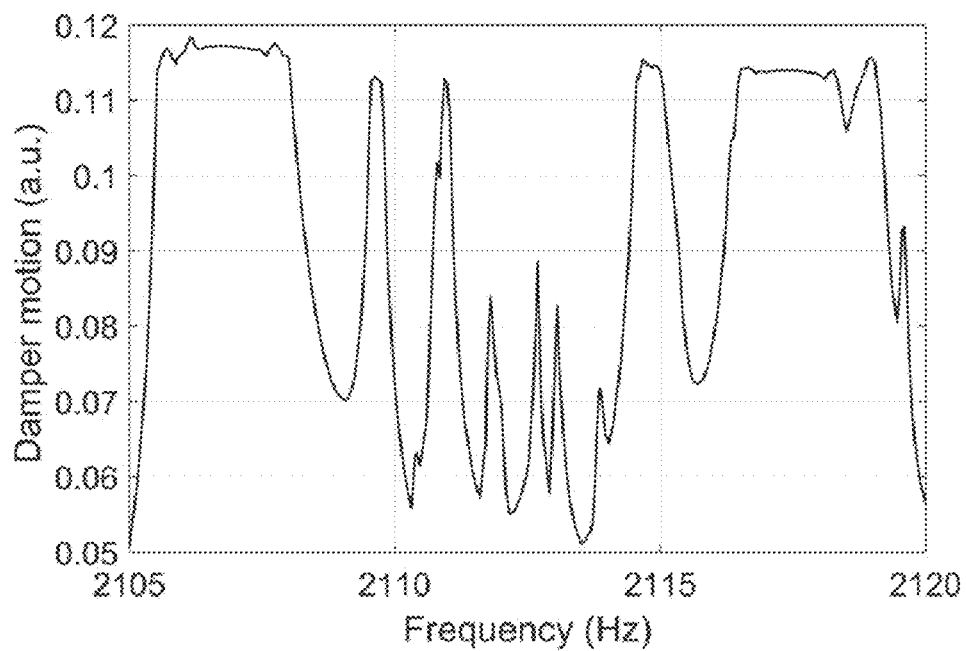

FIG. 57 is a graph illustrating damper response for the tuned damper corresponding to FIG. 55.

Figure 58:
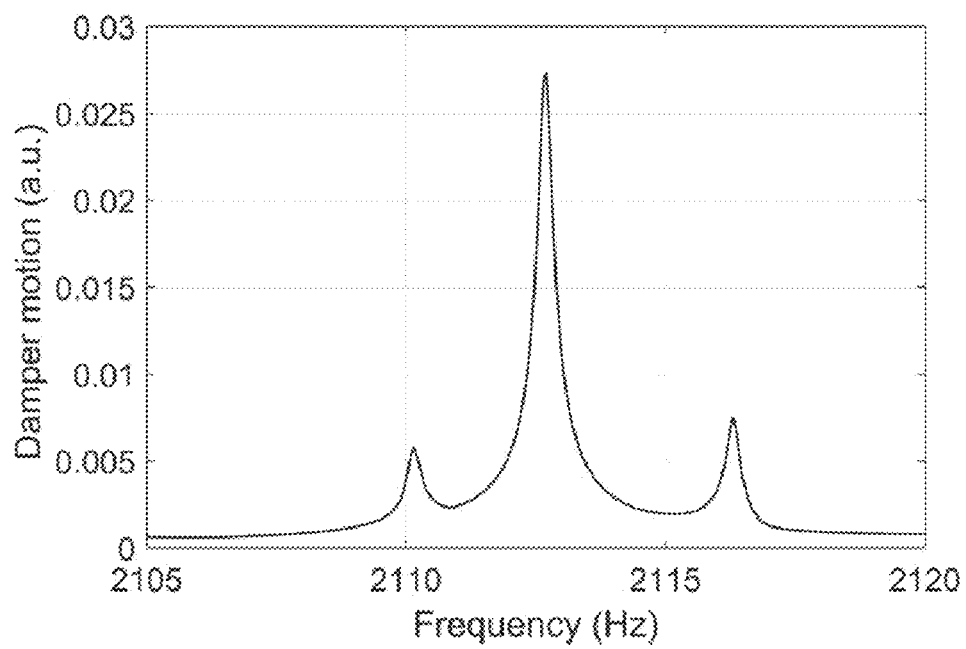

FIG. 58 is a graph illustrating damper response for the non-tuned damper corresponding to FIG. 55.

Figure 59:
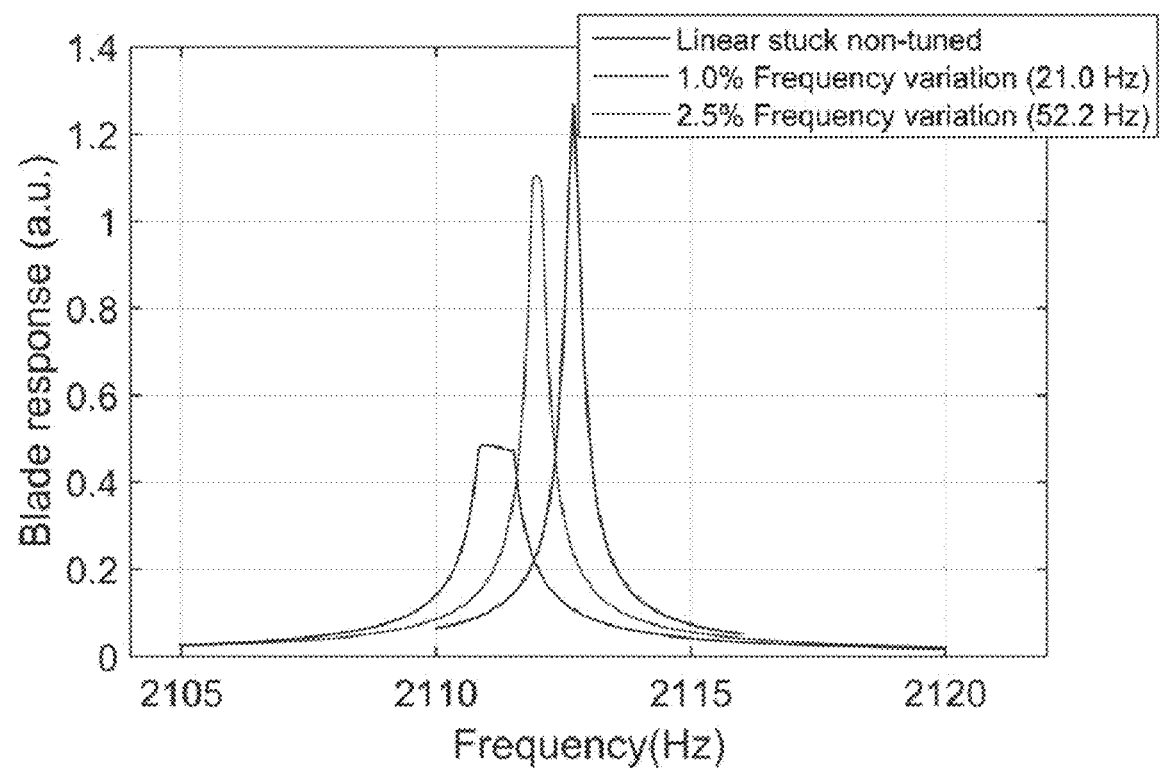

FIG. 59 is a graph illustrating the effect of damper detuning on the response of the IBR (nonlinear).

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Prior to the discussion of detailed theory, methodology, and exemplary results and analysis of the present invention as set forth below, a brief discussion of the general concepts of the present teachings is provided. However, it should be understood that the principles of the present teachings are applicable to a wide range of damping applications and associated rotating members. Therefore, although the discussion herein is directed to integrally bladed rotors (i.e., IBRs) for example, the present teachings are also applicable to rotating members, cyclic members, symmetrical and asymmetrical members, and other structures. It should also be understood that the principles of the present teachings are further applicable in connection with retrofitting existing members and/or incorporation into the design of newly manufactured members. Additional variations in the design of the present teachings are anticipated.

Generally, as illustrated in the present figures and in accordance with the present teachings, a tuned vibration absorber 10 is provided for use in or with a rotating member or IBR 100 to interact with the rotating member 100 through surface or frictional contact. It should be understood that the frictional contact could be directly on the member 100 or directly on the damper itself. As will be discussed, vibration absorber 10 effectively damps vibration in IBRs based on the tuned vibration absorber principles of the present teachings.

According to these principles, a tuning method for vibration reduction of a multi-DOF system based on the addition of a multi-DOF damper is disclosed. In some embodiments, this method could use a mistuned or tuned damper to preserve the ability to target any IBR modes independent of nodal diameter. The effectiveness of the present design was studied by calculating the forced response of the system. Linear and nonlinear results were obtained to compare the effectiveness of the present tuned vibration absorber 10 to a conventional non-tuned ring damper. A significant amplitude reduction was achieved using the present teachings. This reduction was made possible by enabling frictional nonlinearities to dissipate energy by means of increased damper motion. The present teachings are configured to reduce the vibration level of one or multiple IBR modes.

Figure 1A:
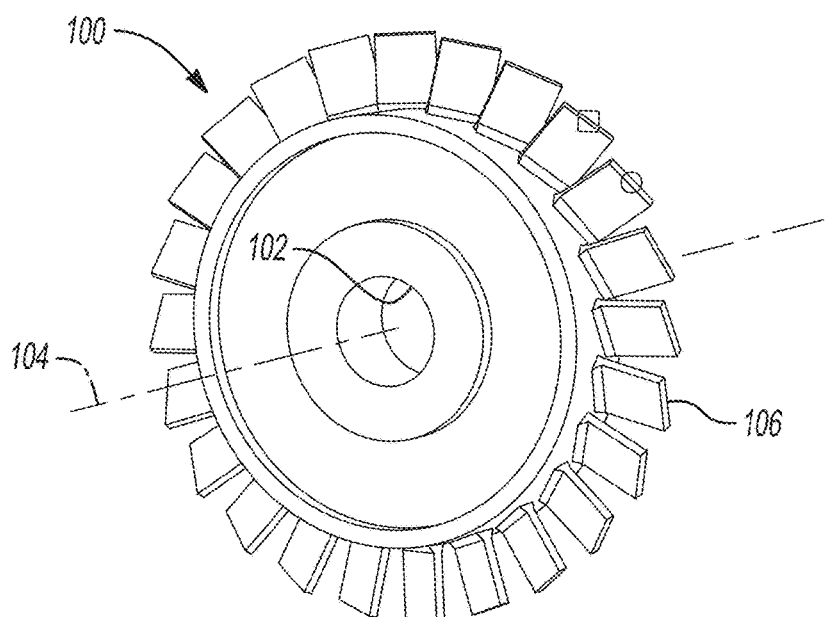
FIGS. 1A and 1B illustrate bladed disks (IBRs).
Figure 1B:
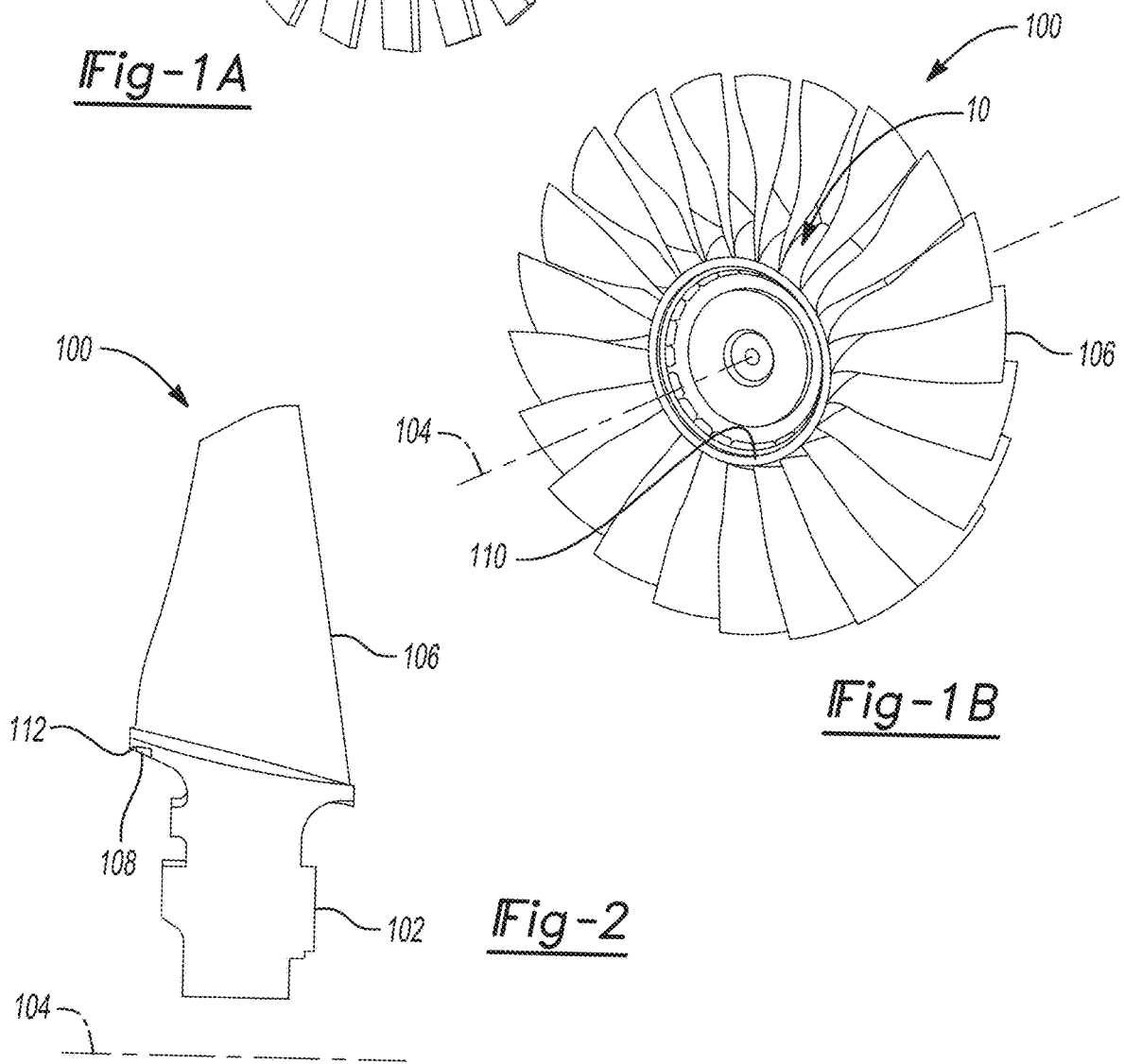
Figure 2:
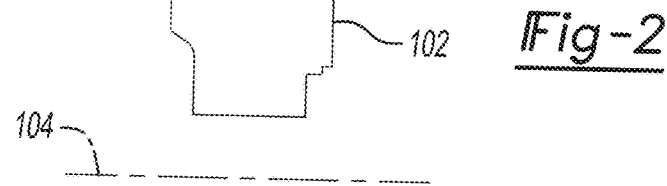
FIG. 2 illustrates a cross-section view of the IBR.
Figure 3:
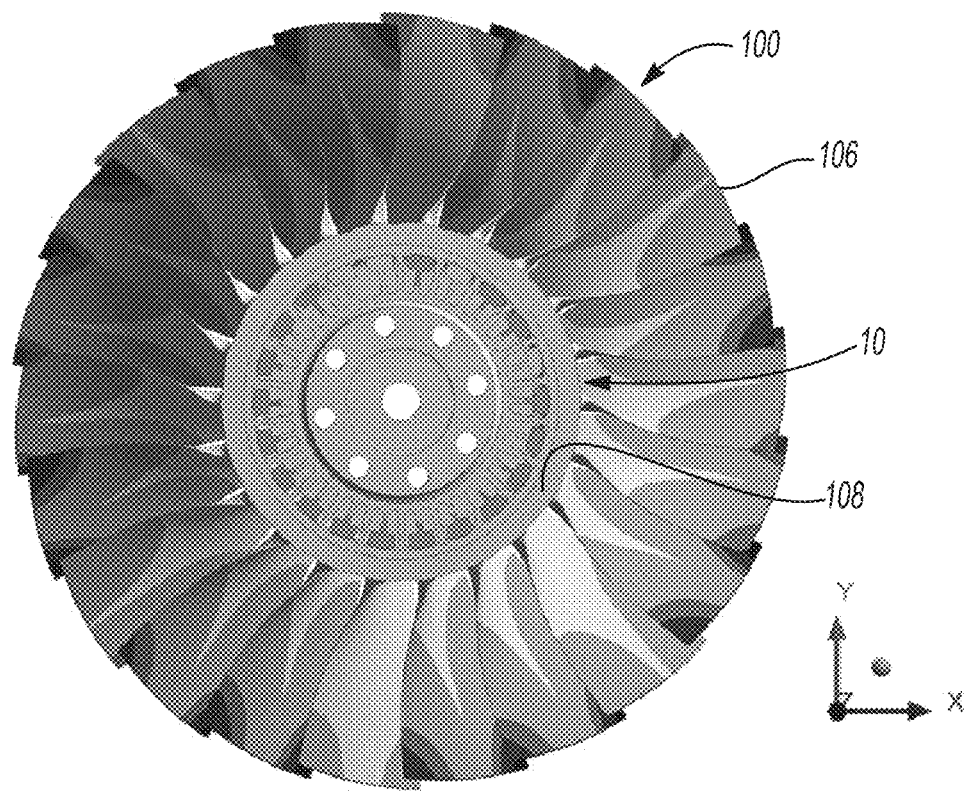
FIG. 3 illustrates an IBR having a vibration absorber according to the present teachings installed therein.
Figure 4:
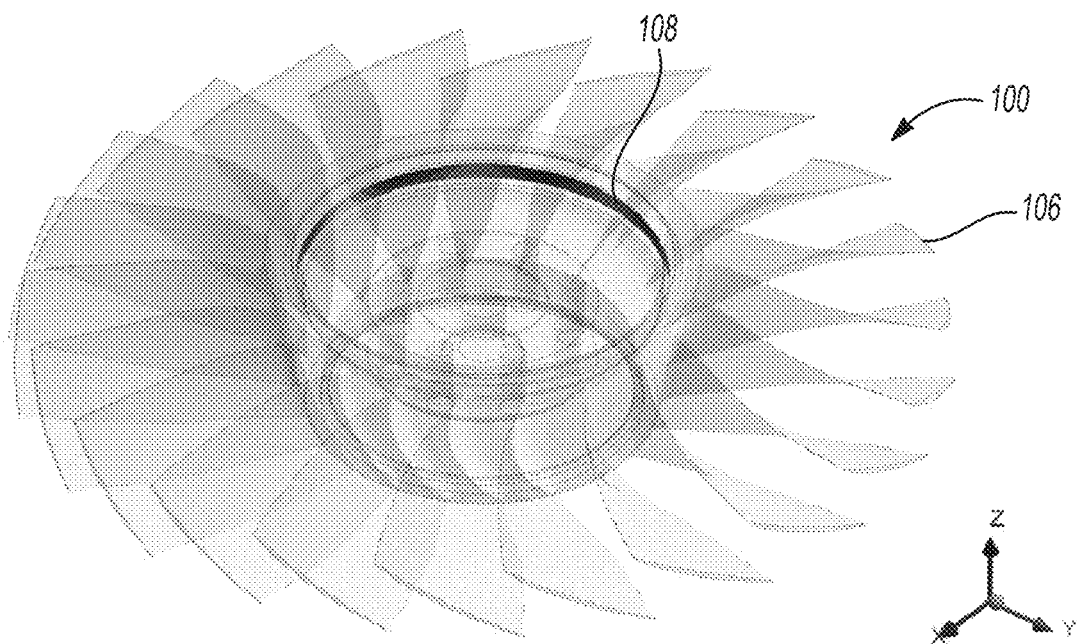
FIG. 4 illustrates an IBR having a vibration absorber according to the present teachings installed therein where the location where the vibration absorber damper is hosted is highlighted
Figure 5:
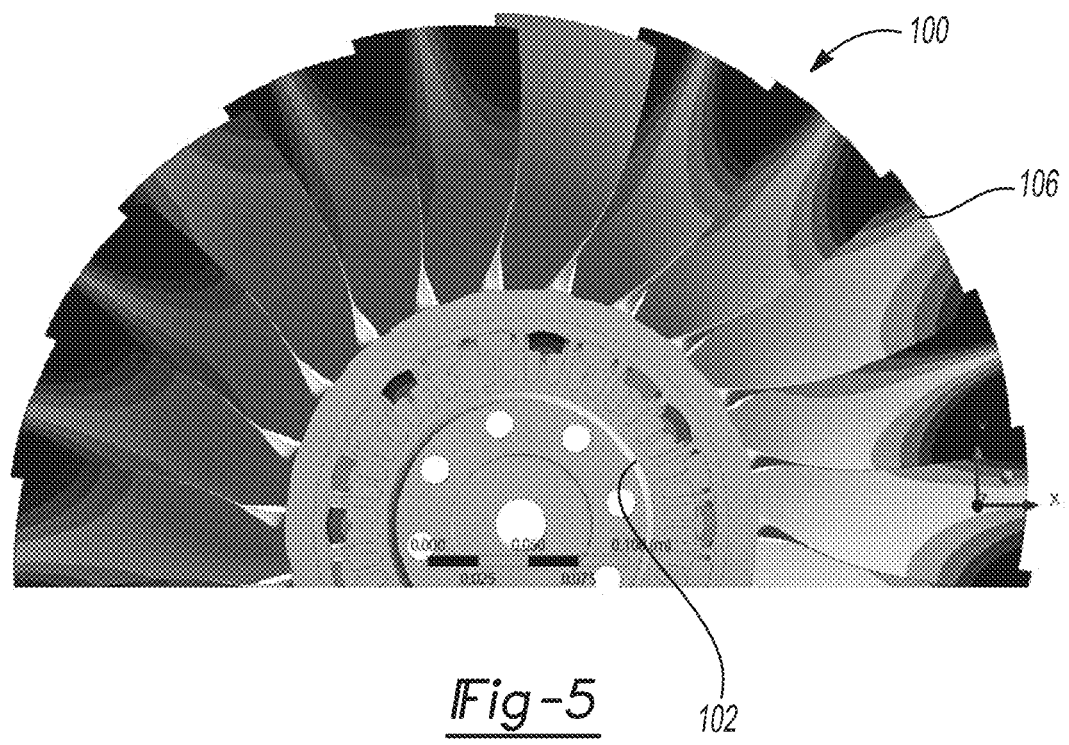
FIG. 5 illustrates an IBR having a vibration absorber according to the present teachings installed therein.
Figure 6:
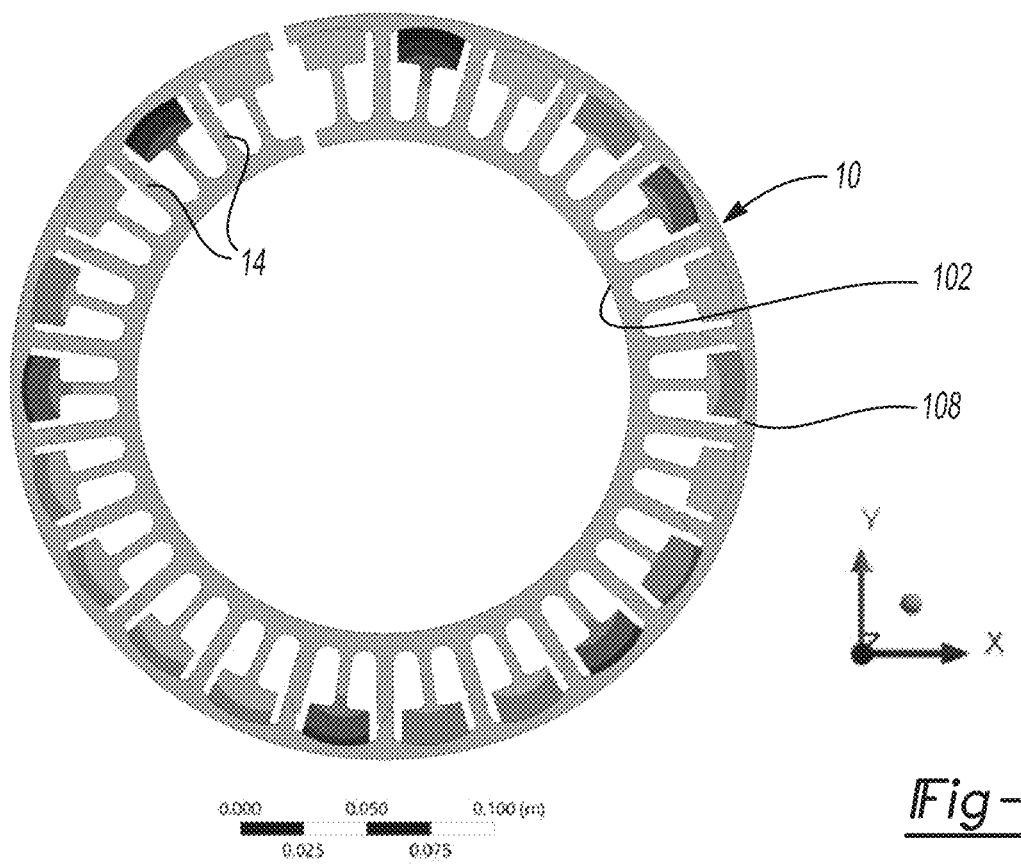
FIG. 6 illustrates an enlarged view of the vibration absorber according to the present teachings.
Figure 10:
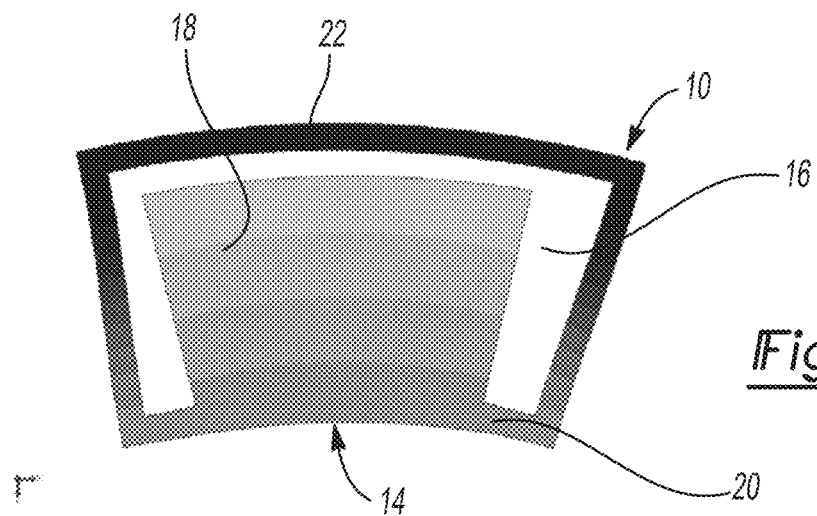
FIG. 10 illustrates a sample motion of a cellular structure of the vibration absorber according to some embodiments of the present teachings.
Figure 11:
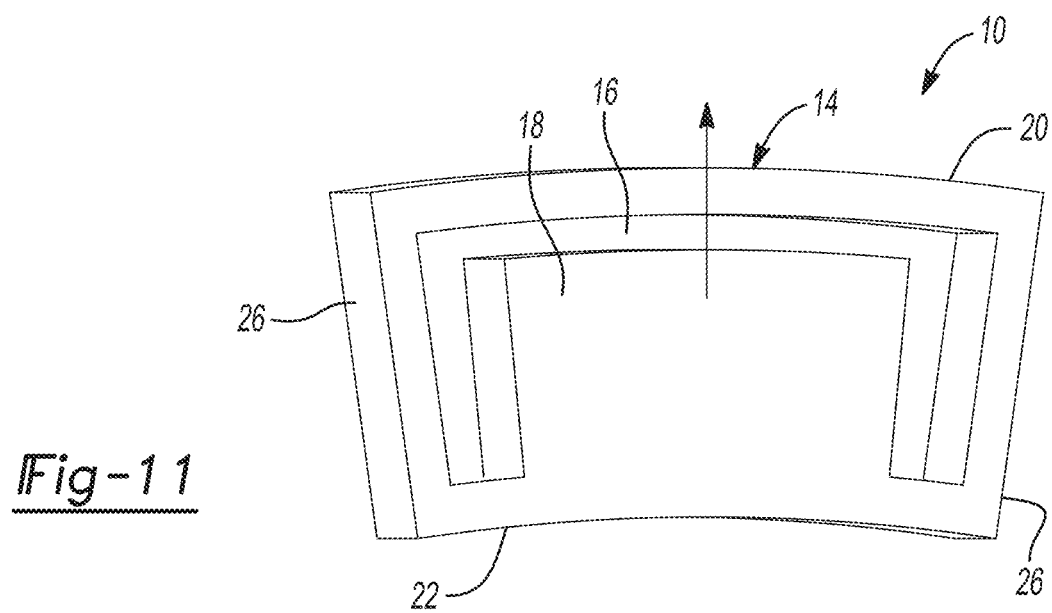
FIG. 11 illustrates a cellular structure of the vibration absorber according to some embodiments of the present teachings.
Figure 12:
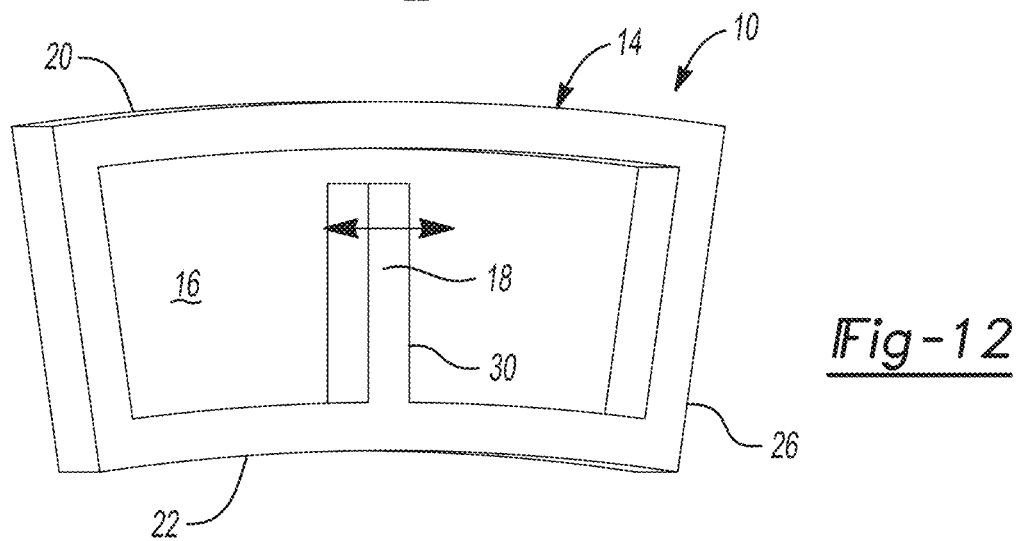
FIG. 12 illustrates a cellular structure of the vibration absorber according to some embodiments of the present teachings.
Figure 16A:
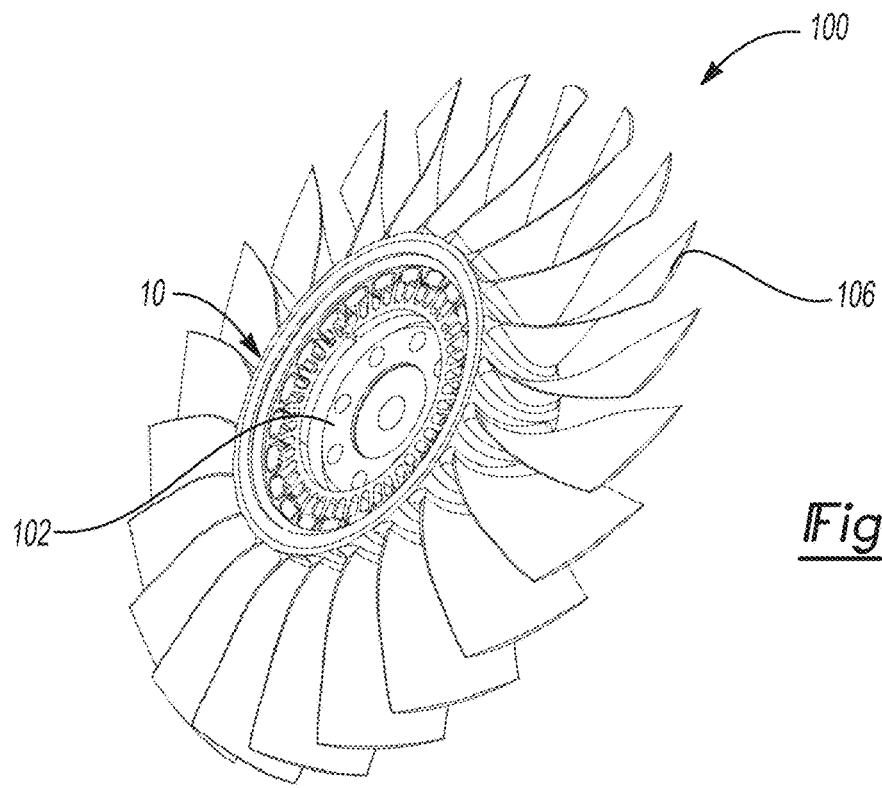
FIGS. 16A-16C illustrate an IBR having a vibration absorber according to the present teachings.
Figure 16B:
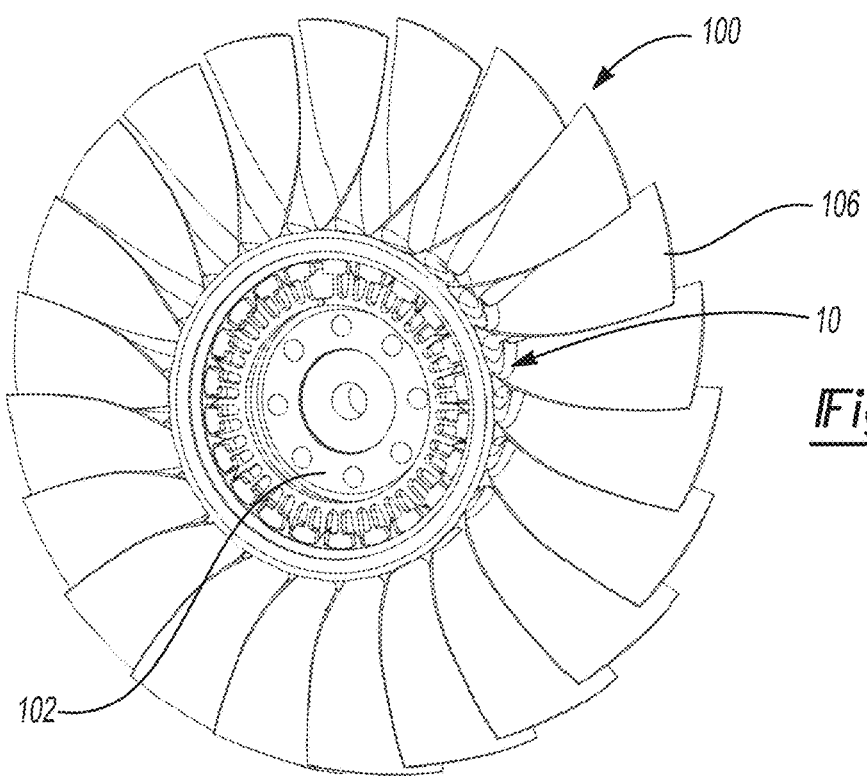
Figure 16C:
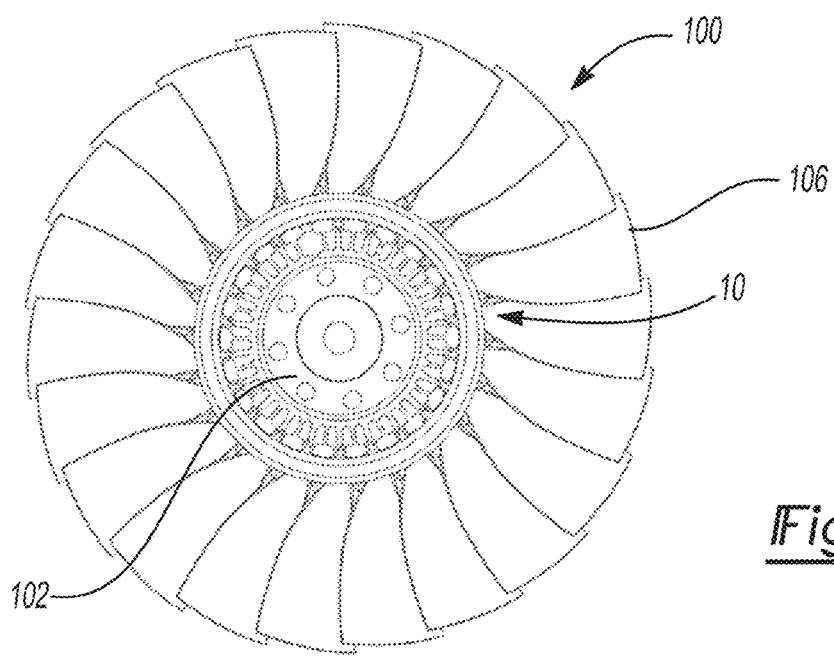
Figure 17:
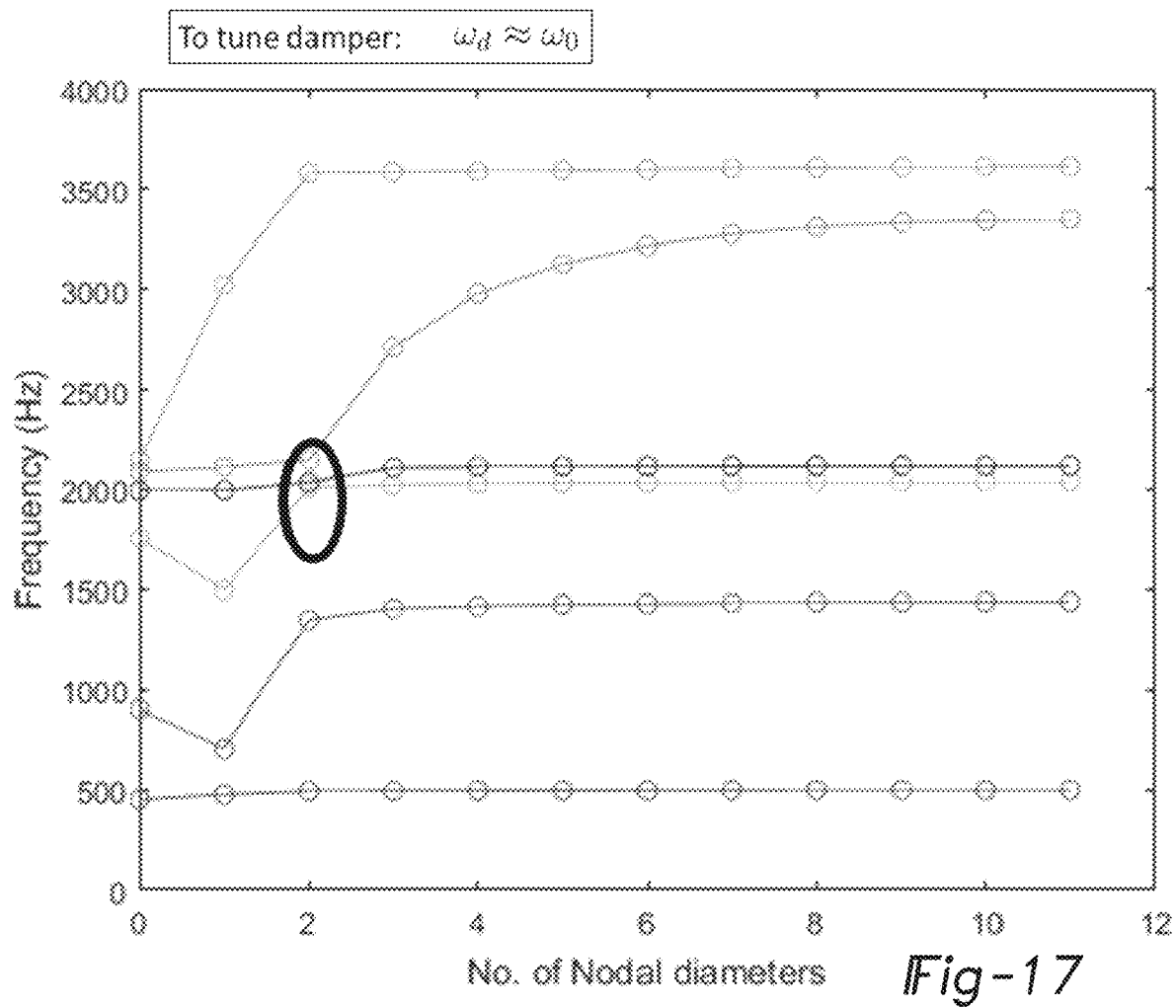
FIG. 17 is a graph illustrating number of nodal diameters versus frequency of an exemplary IBR.
Figure 18A:
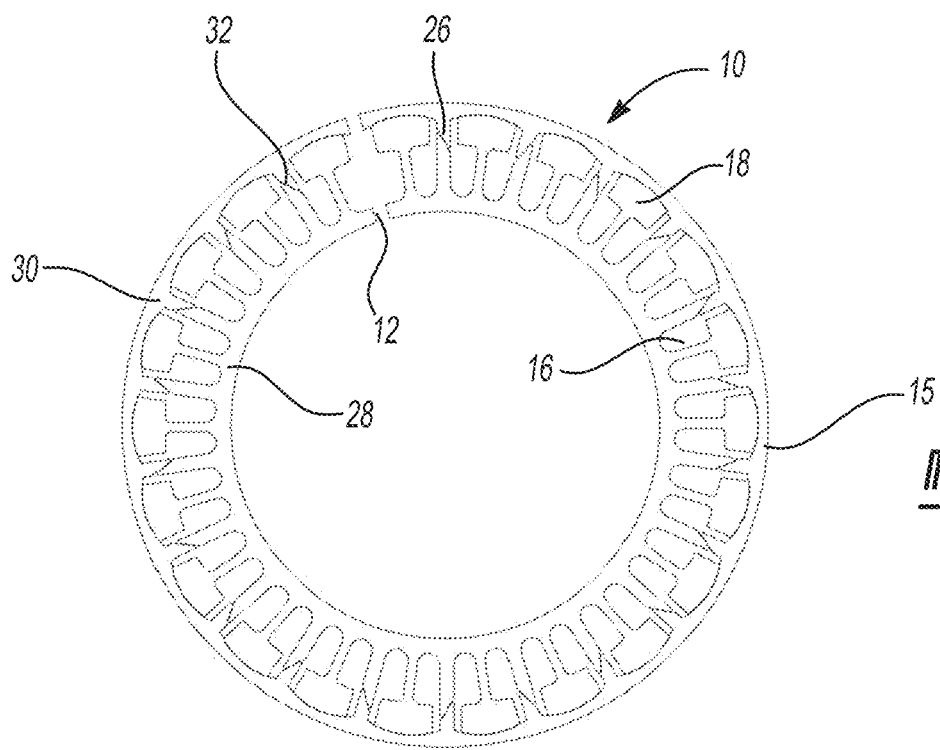
FIGS. 18A-18B illustrate a vibration absorber having slanted pillars according to the present teachings.
Figure 18B:
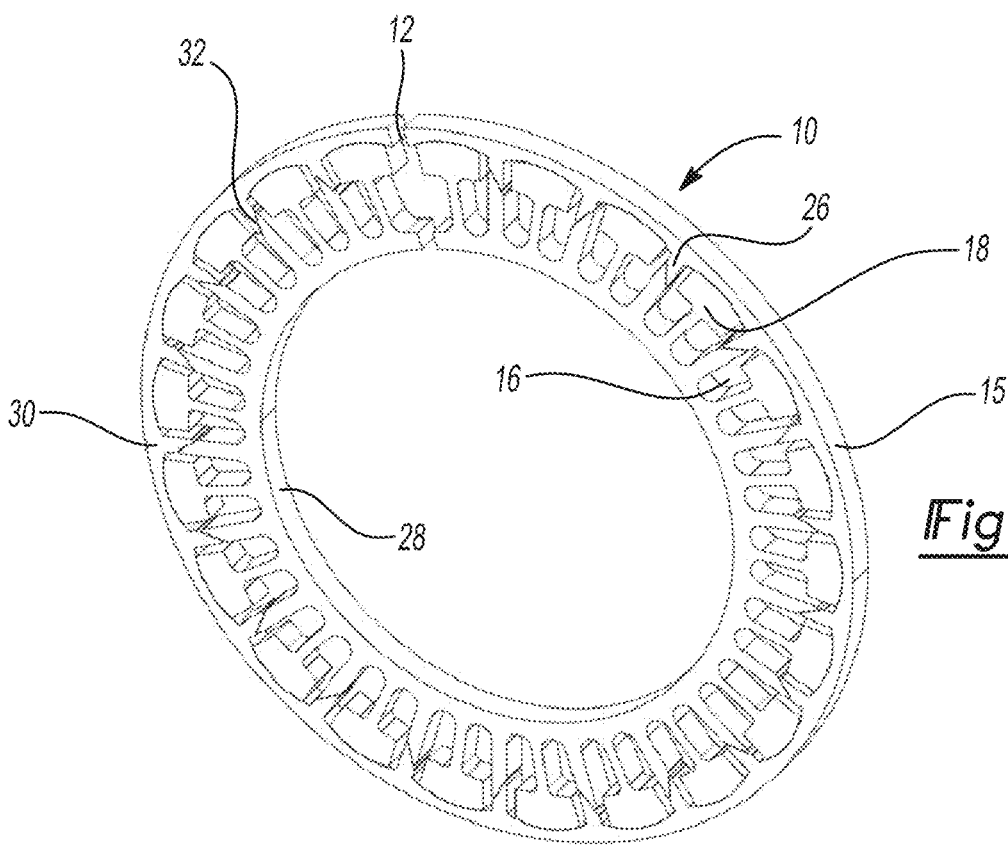
Figure 19A:
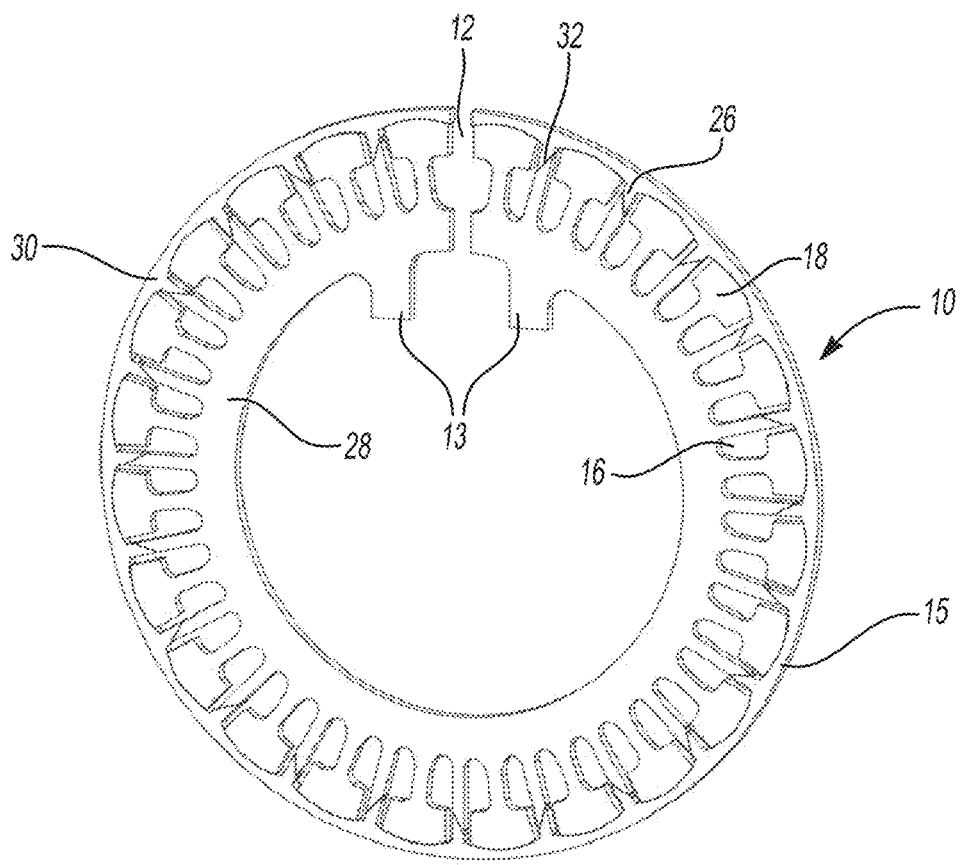
FIGS. 19A-19B illustrate a vibration absorber having slanted pillars according to the present teachings.
Figure 19B:
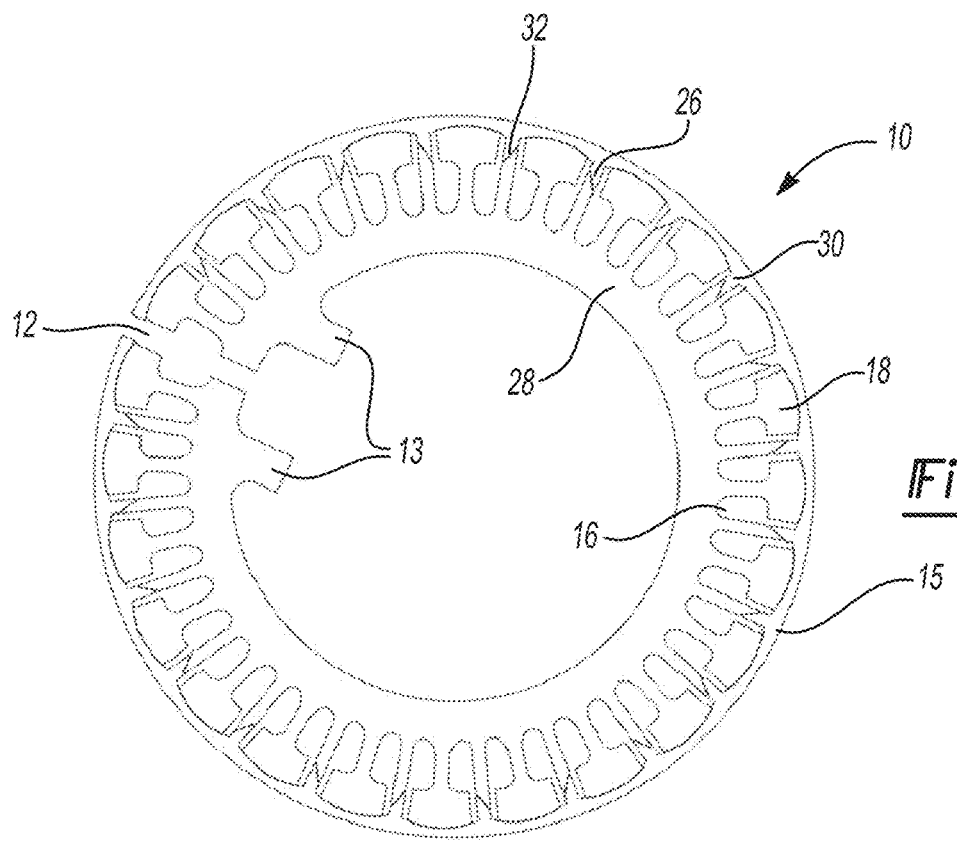
Figure 20:
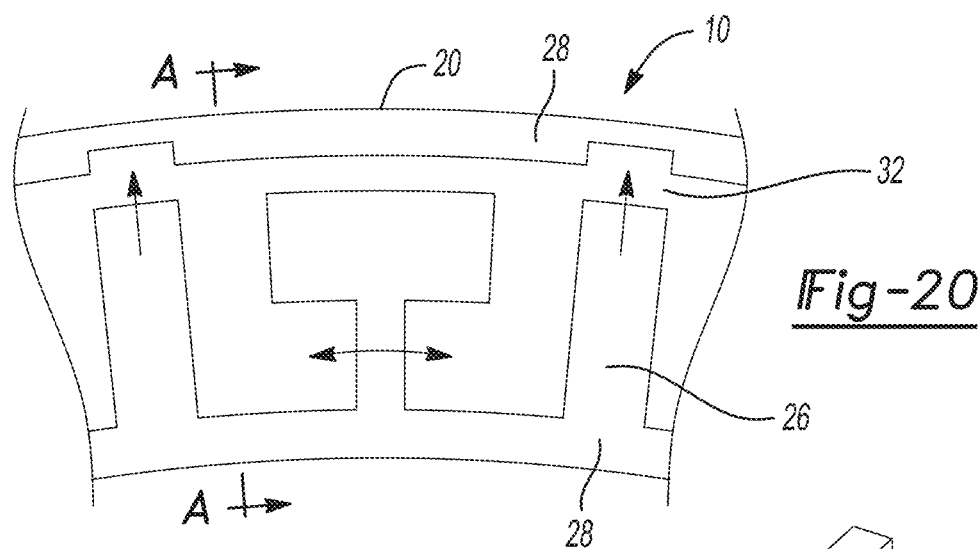
FIG. 20 illustrates a cellular structure of the vibration absorber according to some embodiments of the present teachings.
Figure 21:
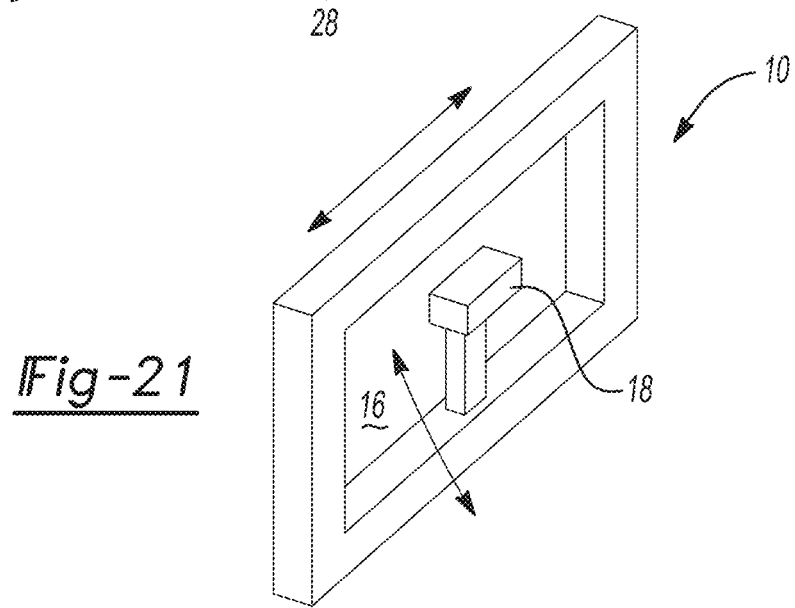
FIG. 21 illustrates a cellular structure of the vibration absorber according to some embodiments of the present teachings.

As illustrated in at least FIGS. 1A-1B, rotating member 100 can comprise a cyclic symmetric structure and, more particularly, can be an exemplary IBR. IBR 100 can have a central hub portion 102 that is configured for rotation about a rotational axis 104. IBR 100 can further have a plurality of blades or radial members 106. In some embodiments, each of the plurality of blades 106 radially extends from and, in some embodiments, is integrally formed with hub portion 102. Traditionally, each of the plurality of blades 106 defines a three-dimensional contour or airfoil for driving or being driven by fluid, such as air. The fluid can travel along a flow path extending between each of the plurality of blades 106 in a direction generally parallel to the rotational axis 104. Furthermore, in some embodiments as illustrated in FIGS. 2-6, the hub portion 102 of the IBR 100 can include one or more circumferential grooves 108 that is each coaxial or otherwise centered on the rotational axis 104. In some embodiments, groove 108 is disposed within hub portion 102 such that groove 108 is not within the fluid flow path. Moreover, in some embodiments, groove 108 is configured to form an inwardly-facing opened channel, thereby facing rotational axis 104 (see FIG. 2).

Although conventional ring dampers can be positioned within a groove of an IBR, it should be understood that conventional ring dampers have been found to be ineffective for damping vibration because there is often no movement of the ring damper relative to the IBR and they are not properly tuned to the application. In other words, conventional ring dampers may become stuck or otherwise constrained in the groove and consequently fail to provide sufficient damping properties, absorb energy, and/or shift the resultant frequency.

According to the principles of the present teachings, as illustrated in FIGS. 6-16C, the tuned vibration absorber 10 can comprise any one of a number of features and properties specifically adapted, designed, and configured to interact with the rotating member 100 to achieve a reduced and predictable vibration amplitude and/or predetermined frequency.

In some embodiments, tuned vibration absorber 10 is ring-shaped and sized to be received at least partially within groove 108 of hub portion 102. However, it should be understood that tuned vibration absorber 10 can be operably coupled to IBR 100 via alternative methodologies. Generally, in some embodiments, vibration absorber 10 can be formed as a single circular member or can comprise a plurality of discrete circular ring portions that collectively generally define a circular ring assembly. In some embodiments, vibration absorber 10 can have a gap 12 (FIGS. 7, 18A-18B, and 19A-19B) or other slot to permit the ring of tuned vibration absorber 10 to be partially collapsed to a smaller overall diameter when inserted within groove 108. In some embodiments, compression tabs 13 can be provided, generally adjacent gap 12, to facilitate collapsing of vibration absorber 10 during assembly. It should be appreciated that gap 12 can be sized appropriately to permit the outer diameter 15 of tuned vibration absorber 10 (after collapsing) to be smaller than an inner diameter 110 of a sidewall 112 of groove 108 (see FIGS. 1B and 2) to provide sufficient clearance for insertion of tuned vibration absorber 10 into groove 108 during assembly.

As illustrated in FIGS. 7 and 8, tuned vibration absorber 10 can comprise a plurality of repetitive cellular structures 14. Each of the cellular structures 14 can define a hollow interior section 16. As will be described in detail herein, at least some of the hollow interior sections 16 of the plurality of repetitive cellular structures 14 can comprise one or more deformable members 18 disposed therein that is configured to interact with the IBR 100 to damp and/or modify vibration thereof. In some embodiments, tuned vibration absorber 10 can comprise distal wall 20 extending about an outer diameter surface thereof and a proximal wall 22 extending about an inner diameter surface thereof. Distal wall 20 and proximal wall 22 can each be circular having a radius such that the corresponding center point is coaxial with axis of rotation 104 when installed in groove 108 or otherwise attached to IBR 100. However, it should be understood that alternative shapes for distal wall 20 and/or proximal wall 22 are anticipated, including, but not limited to, elliptical. As illustrated in FIGS. 7 and/or 8, it should be noted that distal wall 20 and/or proximal wall 22 can be continuous to define a generally flat surface or can be interrupted or otherwise non-continuous to form a plurality of discrete surfaces. The generally flat outer surface 24 extending along distal wall 20 may be conducive to form a consistent engagement surface between the generally flat outer surface 24 and a corresponding flat surface within groove 108.

As particularly illustrated in FIGS. 9-13, in some embodiments, distal wall 20 is joined to proximal wall 22 via a pair of sidewalls 26. Generally, the pair of sidewalls 26 can extend in a radial direction relative to IBR 100 and define a boundary between adjacent ones of the plurality of cellular structures 14. Collectively, distal wall 20, proximal wall 22, and the pair of sidewalls 26 can define the hollow interior section 16. In some embodiments, additional walls of vibration absorber 10 or the associated structure (e.g. sidewalls) of groove 108 can further enclose the exposed sides of hollow interior section 16 to ensure debris or foreign matter is not introduced into hollow interior section 16 and/or to ensure that should a failure of deformable member 18 occur, deformable member 18 is contained within hollow interior section 16.

As illustrated in FIGS. 18A-20, in some embodiments, distal wall 20 is joined to proximal wall 22 via an interface 32 between pairs of sidewalls 26. The configuration of interface 32 makes it possible to separately manufacture an inner ring 28 and an outer ring 30, and to ensure tighter tolerances especially regarding the control of the size of the hollow interior section 16. In some embodiments, as illustrated in FIGS. 18A-19B, this mating interface 32 can be disposed along a portion of sidewall 26 extending from inner ring 28, outer ring 30, or both, or at an end thereof. In some embodiments, interface 32 can comprise a complex shape, including but not limited to slanted or interlocking interfaces, which may be used for enhanced control over the contact condition, as well as creation of increased damping due to the introduction of additional frictional interfaces. By way of non-limiting example, this slant or cut can define an angle relative to the radial direction and can be of any desired angle, such as the illustrated angle of approximately 45° (see FIGS. 18A019B). In some embodiments, this interface 32 also provides better control over the deformation of tuned vibration absorber under centrifugal loading or prestress, which in turn affects its effectiveness in operating conditions.

With reference to FIGS. 9-13 and 20-25, in some embodiments, deformable member 18 defines any shape conducive to dissipation, reduction, or modification of the vibration amplitude or frequency of IBR 100. To this end, deformable member 18 is particularly designed and configured to be tuned for a particular frequency range. Generally, in some embodiments, deformable member 18 is configured to be particularly stiff in a radial direction (relative to the IBR 100) and less stiff or flexible in a non-radial direction. That is, deformable member 18 is configured to be stiff in the radial direction and less stiff or flexible in a direction orthogonal to the radial direction, such as the tangential direction and/or axial direction.

Figure 25A:
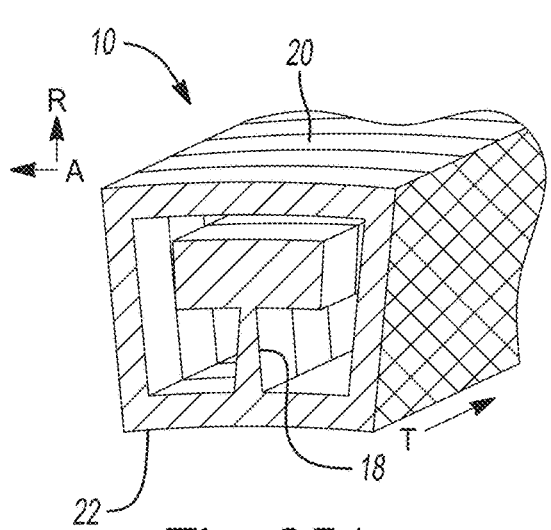
FIGS. 25A-25F illustrates cellular structures of the vibration absorber according to some embodiments of the present teachings.
Figure 25B:
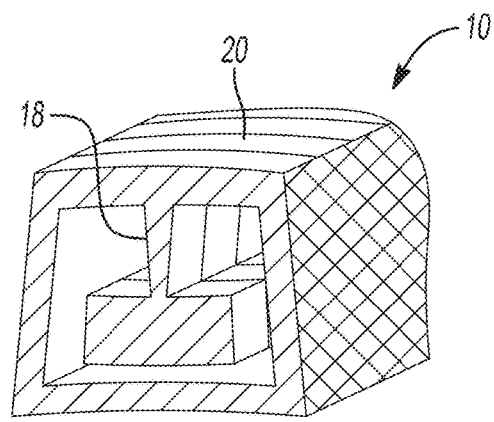
Figure 25C:
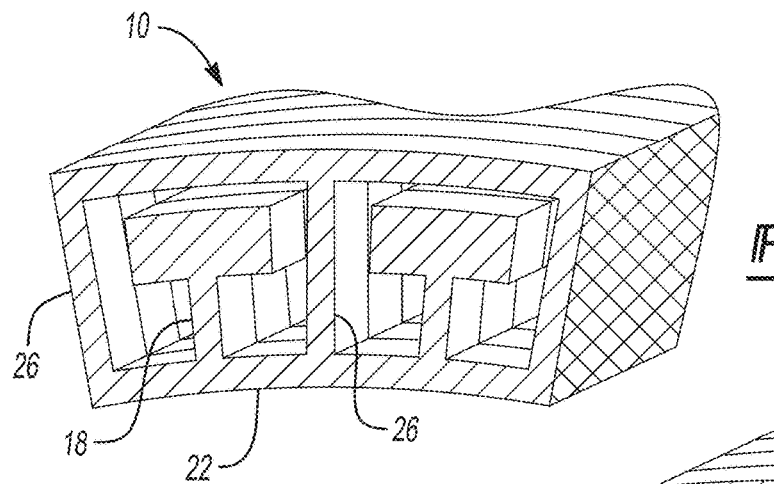
Figure 25D:
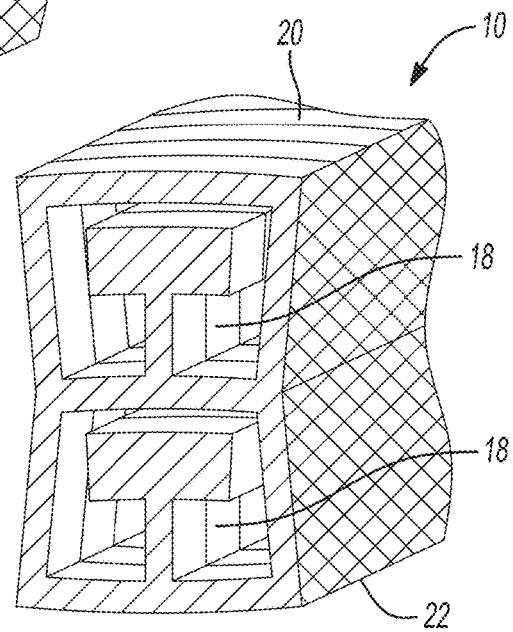
Figure 25E:
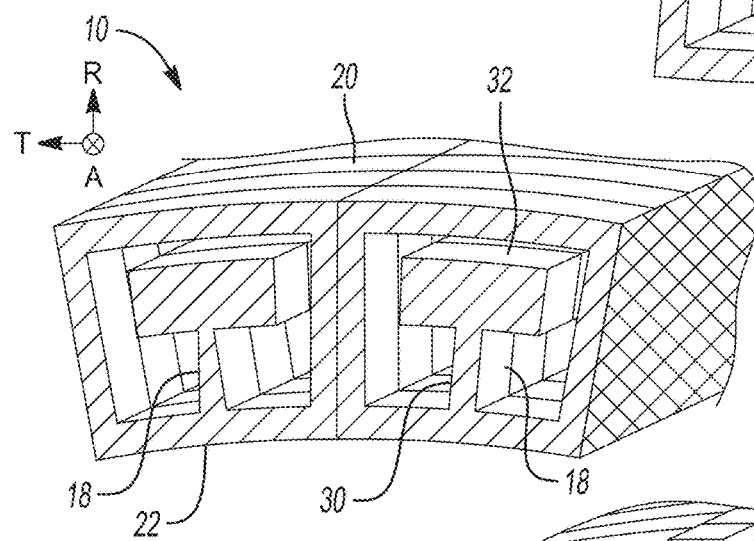
Figure 25F:
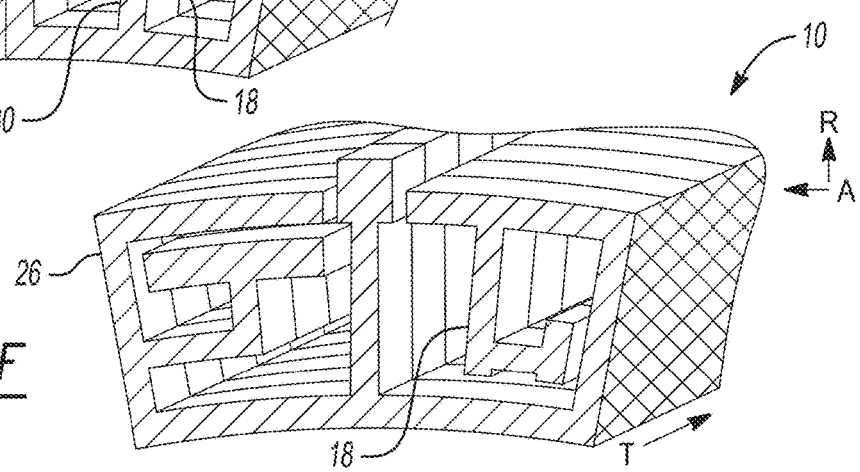

In some embodiments, deformable member 18 is coupled or integrally formed with at least one of the distal wall 20 (see FIG. 25B), the proximal wall 22 (see FIGS. 9-13, 25A, 25C-25F) and the sidewall 26 (see FIG. 25F). In this way, deformable member 18 is generally constrained against movement in the radial direction and flexible in response to bending and/or torsional forces in non-radial directions. To facilitate such tuned response to vibrational energy, deformable member 18 can be shaped and sized to promote response at a particular amplitude or frequency, or to a range of amplitudes or frequencies. It should be understood that the tuning of a particular deformable member 18 and cellular structure 14 can additionally be achieved through geometry, material and interface changes. The energy dissipation can be achieved via one or a combination of mechanisms, including friction, impact, coatings, material manipulation, and the like.

Figure 22:
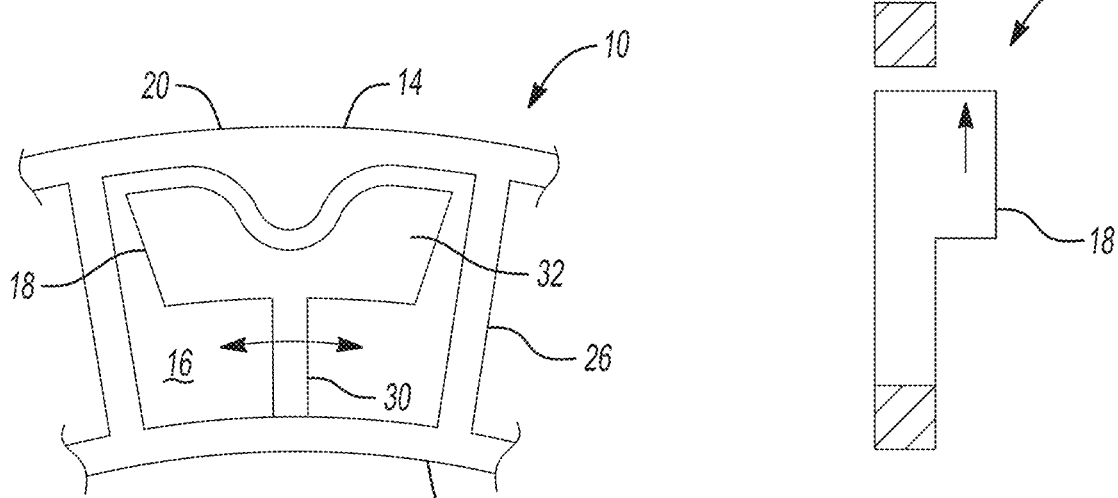
FIG. 22 illustrates a cellular structure of the vibration absorber according to some embodiments of the present teachings.
Figure 23:
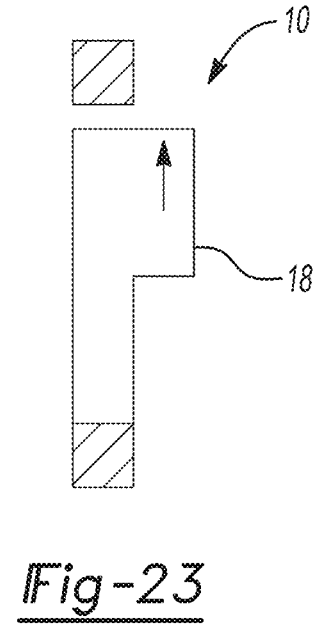
FIG. 23 illustrates a cross-section of a cellular structure of the vibration absorber according to some embodiments of the present teachings.
Figure 24:
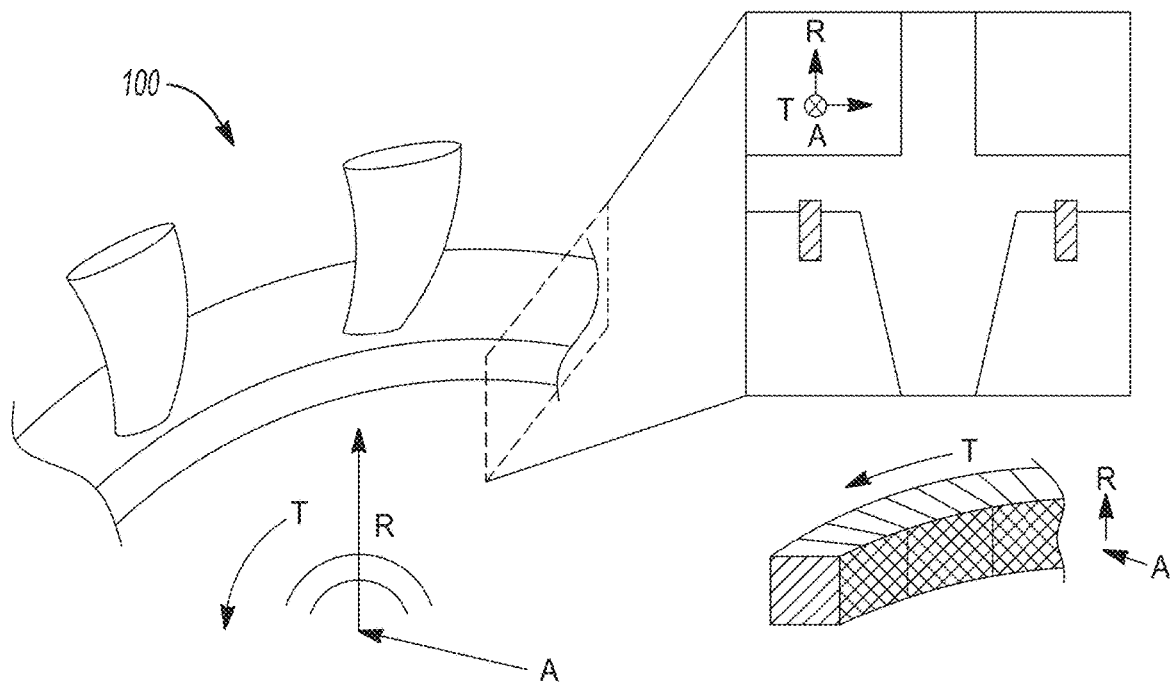
FIG. 24 illustrates an IBR.

In some embodiments, deformable member 18 can be configured as a generally uniform member (see FIG. 9-12), being narrow or wide, and extending from proximal wall 22. However, in some embodiments, deformable member 18 define a shape or contour conducive for operable, such as, but not limited to, an T-shaped member having an elongated portion 30 being coupled on one end to distal wall 20 or proximal wall 22, and having an enlarged portion 32 extending from an opposing end of elongated portion 30. It should be understood that enlarged portion 32 can define a size and/or mass that is greater than elongated portion 30. Moreover, in some embodiments as illustrated in FIG. 13, elongated portion 30 can vary in thickness and/or width along its length and enlarged portion 32 can define an arcuate contour. As illustrated in FIG. 22, in some embodiments, the arcuate contour of enlarged portion 32 can be shaped to complement a corresponding shape formed on the distal wall 20 (or proximal wall 22, in alternative configurations). In this way, one or more features can be formed to limit deflection of deformable member 18 and/or result in increased friction or impact contact for improved performance. In some embodiments, the sidewalls 26 and the elongated portion 30 can be oriented in a non-radial and non-axial direction.

As described herein, deformable member 18 is operable to damp vibration via friction, impact, coatings, material manipulation, and the like. In the case of friction, deformable member 18 can be used to rub, contact, or otherwise interact with adjacent surfaces (i.e., distal wall 20, proximal wall 22, sidewalls 26 or any other surface or structure) to dissipate energy. Similarly, in the case of impact, deformable member 18 can contact adjacent surfaces (i.e. distal wall 20, proximal wall 22, sidewalls 26 or any other surface or structure) to dissipate energy. Furthermore, in the case of material manipulation or coatings, the material of deformable member 18 or of a coating applied thereto, can result in varied deflection and vibrational response resulting in energy dissipation. In some embodiments, a coating may be a single or multiple thin layer(s) of material(s) applied on a selected portion or entire surface of the damper material. In some embodiments, the coating can be distinct from the bulk material of the damper. In some embodiments, the total thickness of the coating can be generally much lower than the thickness of the damper throughout the majority of the structure. The coating may introduce non-linear behavior and significantly change the static and dynamic damping characteristics of the damper. Hence, in some embodiments, the coating can be engineered to achieve the desired dynamic behavior. To illustrate the response of deformable member 18 and vibration absorber 10, attention should be directed to FIG. 27 that illustrates the performance of vibration absorber 10 when disposed in groove 108 of an IBR 100 (of FIG. 26). As illustrated in FIG. 29, an untuned conventional ring damper is used to damp the no-damper curve and results in the exemplary non-tuned damper curve. The non-tuned damper curve shows slightly reduced amplitude and no frequency shift in the resultant curve. However, when vibration absorber 10 is employed as a tuned damper in response to the same no-damper curve (thereby allowing more energy transfer to vibration absorber 10), the exemplary tuned damper curve shows a significant reduction of the amplitude curve at the fundamental frequency and creation of frequency shift peaks at frequencies less than and greater than the fundamental frequency of the no-damper curve. However, when vibration absorber 10 is employed as a tuned damper with friction dissipation in response to the same no-damper curve (thereby leveraging nonlinear frictional damping effect), the tuned damper with friction dissipation curve shows an even-more significant reduction of the amplitude curve ranging from the frequency shift peaks of tuned damper curve and the no-damper curve. Accordingly, vibration absorber 10 using tuned and friction dissipation mechanisms or solutions results in a substantially reduced amplitude. The same can be said of vibration absorber 10 presenting appropriately large damping by means of coatings or other treatments.

In some embodiments, each of the cellular structures 14 of vibration absorber 10 can be configured to define a varying frequency and/or amplitude response to provide enhance damping over a larger frequency range. In this way, the performance characteristics of each cellular structure 14 and associated deformable member(s) 20 can be varied. Moreover, in some embodiments, as illustrated in FIGS. 25C-25F, cellular structures 14 can be arranged relative to each other to provide additional cellular structures 14 and/or performance characteristics. For example, in some embodiments, a row of cellular structures 14 can be arranged in side-by-side configuration or in a stacked or concentric configuration.

With particular reference to FIGS. 28-30, in some embodiments, vibration absorber 10 can comprise one or more finger members 40 that can serve as vibration elements and present rubbing surfaces for frictional energy dissipation, or special damping characteristics provided by, for example, coatings or other treatments.

In some embodiments, the vibration absorber 10 can comprise one deformable element which may contact itself or a plurality of deformable elements which contact among them in an embodiment forming a web-like structure.

In an attempt to provide a complete disclosure, the following details the theory, methodology, and exemplary results and analysis of the present invention. However, it should be understood that the following details relate to specific configurations and testing. Therefore, any reference to specific numerical ranges or details should not be regarded as limiting the scope of the present teachings, unless otherwise claimed. Traditionally, an absorber is analyzed as a linear concept where the harmonic response at natural frequencies of a relatively massive system represented by a single equivalent mass and spring are lowered by the addition of a smaller absorber mass, as shown in FIG. 31. The absorber and its connection stiffness to the original system is tuned to match a targeted natural resonance of the original system ($\omega_t$), such that:

$$\omega_t = \sqrt{\frac{k_t}{m_t}} = \sqrt{\frac{k_d + k_c}{m_d}} = \sqrt{\frac{k_e}{m_d}} \quad (1)$$

Where m and k represent the lumped mass and stiffness of a system or structure The subscript t refers to the targeted system, d to the vibration absorber or damper system, and c to the connection between the two. $k_e = k_d + k_c$ is the equivalent stiffness of the constrained damper. The new system, thus augmented with the absorber will have mass and stiffness system matrices $M_{aug}$ and $K_{aug}$, which may be expressed as:

$$M_{aug} = \begin{bmatrix} m_t & 0 \\ 0 & m_d \end{bmatrix}; K_{aug} = \begin{bmatrix} k_t + k_c & -k_c \\ -k_c & k_e \end{bmatrix} \quad (2)$$

The forced response of the augmented system to an excitation $\bar{f}_t$, expressed in the frequency domain at the target DOF, is given by:

$$\begin{bmatrix} \bar{x}_t \\ \bar{x}_d \end{bmatrix} = [M_{aug}\omega^2 + (1 + j\gamma)K_{aug}]^{-1} \begin{bmatrix} f_t \\ 0 \end{bmatrix}, \quad (3)$$

Where $j=\sqrt{-1}$, $\omega$ is the excitation frequency, and $\gamma$ is the structural damping coefficient. $\bar{x}_t$ and $\bar{x}_d$ are complex quantities representing the magnitude and phase of displacements at the targeted DOF and the damper DOF.

Substituting Eqs. 1 and 2 into Eq. 3 and solving the first row of the resulting matrix equation $\omega=\omega_t$, it may be shown that the amplitude of forced response of the augmented system at the targeted DOF $|\bar{x}_t|$ at $\omega_t$ is given by:

$$|\bar{x}_t(\omega_t)| = \frac{|\bar{f}_t|/\gamma k_t}{\sqrt{\left(1 + \frac{k_c^2 + \gamma^2 k_c k_d}{\gamma^2 k_t k_e}\right)^2 + \frac{k_c^2(k_d - k_c)^2}{\gamma^2 k_t^2 k_e^2}}} \quad (4)$$

Where the symbol |.| represents the magnitude of a complex quantity. The response amplitude of the original target system (without the absorber) which may be recovered by substituting $k_c=0$ in Eq. 4 is the same as the numerator of the expression. Hence, the response of the target DOF of the augmented system at frequency $\omega_t$ will be much lower than the forced response of the target system to the same excitation, as the denominator in Eq. 1 is always greater than 1. Theoretically, the response of the augmented system at $\omega_t$ is perfectly 0 for an undamped system ($\gamma=0$). This reduction in amplitude at the original resonance is clearly seen in FIG. 32 that shows a typical response for a system augmented with an absorber. The reduction in amplitude is achieved because the energy is redirected to the vibration absorber that is tuned to exhibit a resonance at the targeted frequency. The response at the targeted DOF of the augmented system has a local minimum near $w_t$ in the frequency domain with the system having a pair of resonances on either side. This splitting of the original frequency peak is characteristic of vibration absorbers and represents an energy redirection mechanism from the targeted frequency to other frequencies for the targeted DOF.

The concept of tuned absorbers may be extended to multi-DOF systems and indeed finds real world application in many such systems. System equations similar to those in Eq. 2 may be formulated with the corresponding mass and stiffness scalars replaced by matrices representing the targeted system and damper, namely $$M_{aug} = \begin{bmatrix} M_t & 0 \\ 0 & M_d \end{bmatrix}; K_{aug} = \begin{bmatrix} K_t + K_c & -K_c \\ -K_c & K_c + K_D \end{bmatrix}, \quad (5)$$

Where 0 represents a zero matrix. The connection stiffness $K_c$ in this case will be a sparse matrix with non-zero entries at the rows and columns corresponding to the DOFs where the target structure is attached to the damper. In the multi-DOF case, obtaining analytic expressions for the response of the augmented system as in Eq. 4 is challenging. For isolated modes of a multi-DOF system, parallels may be drawn to the single-DOF system, by obtaining modal stiffness and damping values. However, even in the isolated mode case it is not possible to determine prior to dynamic analysis how modes of the targeted system and absorbers will interact and change when the augmented system is formed. Exact reductions to single-DOF models are not feasible for a general case where multiple modes of the structures may interact. In the case of nominally cyclic systems, the structures will also have mode pairs at the same frequency, which will add an additional layer of complexity to the analysis.

Hence, a numerical approach is chosen to analyze the dynamics in this invention. Lumped mass models (LMMs) representing IBRs augmented with a damper designed to act as a vibration absorber are analyzed. Similar LMMs have been used previously to replicate salient effects in IBR dynamics, and are convenient tools for parametric analyses. As shown in FIG. 33, two LMMs were used in this study. In the baseline LMM, the damper is attached to the disk. Another LMM is used to explore alternate locations for the damper, where the damper is attached to the blades such that one damper mass in each sector is attached to a blade mass of the corresponding sector. Unless otherwise stated, any shown results pertain to the baseline LMM. The generation of the system matrices of the baseline LMM is described in this section. The matrices for the other LMM may be derived similarly.

The symbols m and k represent lumped mass and stiffness parameters of a tuned IBR and damper. The subscripts used for representing parameters in different locations of the LMM are b for blade DOFs (with masses $m_{b2}$ and $m_{b1}$ representing the tip and rest of the airfoil respectively), r for disk DOFs, d for damper DOFs, i for interface between disk and blades, c for connection between damper and IBR, g for connection to ground and s for representing connections between sectors. The tuned sector level mass and stiffness matrices $M_{I,aug}^0$ and $K_{I,aug}^0$ representing the interior DOFs of a free sector of the augmented system with no connections to adjacent sectors are given by:

$$M_{I,aug}^0 = \text{Diag}([m_{b2}\ m_{b1}\ m_{r1}\ m_{d1}\ m_{d2}]) \tag{6}$$

$$K_{I,aug}^0 = \begin{bmatrix} k_{b1} & -k_{b1} & 0 & 0 & 0 \\ -k_{b1} & k_{b1}+k_{i1} & -k_{i1} & 0 & 0 \\ 0 & -k_{i1} & k_{i1}+k_{g1}+k_{c1} & -k_{c1} & 0 \\ 0 & 0 & -k_{c1} & k_{c1}+k_{d1} & -k_{d1} \\ 0 & 0 & 0 & -k_{d1} & k_{d1} \end{bmatrix} \tag{7}$$

Where Diag(.) represents a diagonal matrix whose entries match those of the vector in the parenthesis. It is also possible to formulate stiffness matrices representing the connectivity between sectors as:

$$K_{C1,aug}^0 = \text{Diag}([0\ 0\ 2k_{s1}\ 2k_{s2}\ 2k_{s2}]),$$

$$K_{C2,aug}^0 = \text{Diag}([0\ 0\ -k_{s1}\ -k_{s2}\ -k_{s2}]) \tag{8}$$

Stiffness mistuning may be applied both at the blades and the damper and is modeled by multiplying $k_{b1}$ and $k_{d1}$ at blade n by the mistuning parameters $\delta_{b,n}$ and $\delta_{d,n}$ (n=1, ..., N) to obtain a mistuned stiffness matrix $K_{I,aug}^n$ at sector n. The mass matrices at all sectors are identical such that $M_{I,aug}^n = M_{I,aug}^0$. Using Eqs. 6-8 the matrices for the full wheel model of the LMM with N sectors may be obtained as:

$$M_{L,aug} = BDiag(M_{I,aug}^1, M_{I,aug}^2, \ldots, M_{I,aug}^N), \tag{9}$$

$$K_{L,aug} = \begin{bmatrix} K_{I,aug}^1+K_{C1,aug}^0 & K_{C2,aug}^0 & 0 & \cdots & 0 & K_{C2,aug}^0 \\ K_{C2,aug}^0 & K_{I,aug}^2+K_{C1,aug}^0 & K_{C2,aug}^0 & 0 & \cdots & 0 \\ 0 & K_{C2,aug}^0 & K_{I,aug}^2+K_{C1,aug}^0 & K_{C2,aug}^0 & \cdots & 0 \\ \vdots & \ddots & \ddots & \ddots & \vdots & \vdots \\ 0 & \cdots & 0 & K_{C2,aug}^0 & K_{I,aug}^{N-1}+K_{C1,aug}^0 & K_{C2,aug}^0 \\ K_{C2,aug}^0 & 0 & \cdots & 0 & K_{C2,aug}^0 & K_{I,aug}^N+K_{C1,aug}^0 \end{bmatrix}$$

Where BDiag(.) represents a block matrix composed of the matrices inside the parenthesis. The damping matrix $C_{L,aug}$ is generated by applying different proportional damping parameters to different parts of the model. Specifically, $\beta_b$ is the proportional damping value used for the IBR interior DOFs and may be multiplied with $k_{b1}$, $k_{i1}$, $k_{s1}$, and $k_g$ to obtain local damping values at those locations. Similarly, $\beta_d$ is the proportional damping value for the damper interior DOFs and is applied to $k_{d1}$ and $k_{s2}$. $\beta_c$ is the proportional damping for the connection between IBR and damper, and is applied to the stiffness $k_{c1}$. $C_{L,aug}$ may then be obtained in a similar manner as the stiffness matrix by first replacing the stiffness value in Eqns. 7 and Eqns. 8 by the damping values and then assembling it in a similar manner to Eqn. 10. The response $q_L$ at different DOFs of the augmented model may be obtained by solving the following equation:

$$[-\omega^2 M_{L,aug}+j\omega C_{L,aug}+K_{L,aug}]q_{L,aug}=f_E$$

Where the excitation force $f_E$ is a vector of complex numbers representing a traveling wave excitation applied at the DOFs corresponding to $m_{b2}$ at each sector whose spatial pattern at any time t is given as:

$$f_E(t,\theta) = |F|\cos\left(\frac{2\pi EO}{N}t+\theta\right),$$

Where $\theta$ is the circumferential angle along the IBR, EO is the engine order of excitation, and |F| is the amplitude of excitation. System matrices for the free IBR and constrained damper may be obtained by removing appropriate entries or DOFs from the augmented system. Tuning of the vibration absorber is here performed by matching a natural frequency of the constrained damper to a targeted natural frequency of the free IBR. A damper with frequency close the one targeted could also be called tuned.

An LMM with 32 sectors was modeled using the parameters listed in FIG. 34. The natural frequencies of the corresponding IBR, constrained damper and augmented system are compared to the number of NDs of the corresponding mode in FIG. 35, where the two lines marked with squares correspond to the first two families of the IBR-alone system, the line marked with diamonds to the first family of the constrained damper and the lines marked with stars represent the first three modal families of augmented system. The first ND 4 mode of the IBR is targeted, and the natural frequencies of the constrained damper is tuned to match the corresponding IBR-alone natural frequency at 596.61 Hz.

The resulting damper parameter values achieved after this tuning process for EO 4 targeted mode are listed in FIG. 34. One may observe from FIG. 35 that the damper frequency matches the targeted value. The parameters in FIG. 34 are referred to as the nominal parameters for this invention. The maximum response amplitude at the blade tip ($m_{b2}$) over all blades of a perfectly cyclic symmetric (without any mistuning) IBR-alone, and the response of the augmented system to an EO 4 excitation in a frequency range close to the targeted frequency are shown in FIG. 36. Since the system is tuned, all the blade amplitudes are identical, and only ND 4 modes are excited because the excitation is orthogonal to all modes with other NDs which have natural frequencies close to this range. It may be observed as well, that in this multi-DOF system, the minimum response of the augmented system is not exactly at the targeted frequency but close to it. This indicates that tuning to a slightly higher frequency might increase effectiveness of the damper further, because if the minimum is exactly on the natural frequency, then the two split peaks have similar amplitudes (lower than the maximum response of the augmented system at the second peak in FIG. 36).

Frequency splitting in the augmented system frequencies may be observed in the zoomed-in view provided in FIG. 35. The augmented system has two mode-pairs on either side of the targeted frequencies. Since the system is linear and tuned, the effect of these modes on the response may be studied by analyzing the normalized spatial response amplitudes of the DOFs of the first sector, which are plotted in FIG. 37 for different frequencies A-D corresponding to the points marked in FIG. 36. It may be seen that due to the tuning of the damper, there is significant response at the damper DOFs for all the frequencies, and this leads to energy transfer to the damper and a reduction in the peak response overall. At point B where the response is minimum, it may be seen that the damper responds much more relative to the IBR, leading to maximum energy absorption and a maximum reduction in blade amplitudes. The effect of tuning of a constrained damper mode with a different ND to that of the targeted IBR mode was also analyzed.

The robustness of the frequency tuning process may be determined by analyzing the sensitivity of the damper to various model parameters and the change in damper effectiveness. Damper effectiveness is defined as the ratio of the maximum IBR-alone response amplitude at $m_{b2}$ over all blades in a given frequency range to the maximum amplitude of the augmented system across the same DOFs and frequency range for identical excitation and IBR parameters. If the maximum response of the augmented system is identical to the IBR-alone system, damper effectiveness is 1, which indicates that the attachment of the damper does not provide any reduction in the peak response.

The different lines in FIG. 38 show the variation of the damper effectiveness with $\beta_d$ which characterizes the linear damping in the damper. The effect of imperfect tuning is also analyzed for each value of $\beta_d$ by perturbing $k_{c1}$, $k_{d1}$ and $k_{s2}$ such that the constrained damper natural frequency $\omega_d$ differs from the targeted IBR frequency $\omega_t$. In this case, a frequency range of 570 Hz to 620 Hz was considered for calculating damper effectiveness, which encompasses the range of $\omega_d$ values analyzed. It may be observed that at very low values of $\beta_d$ the maximum possible damping effectiveness is low since energy is transferred to the damper, but not dissipated. As $\beta_d$ increases, the maximum damping that may be achieved first increases and then decreases. In other words, there is an optimal value of $\beta_d$ if maximum damping effectiveness is the only consideration. This is the case because too large a value of $\beta_d$ will lead to negligible damper motion, hindering energy transfer. However, it may also be seen that with larger values of $\beta_d$ the system becomes more robust to improper tuning, with larger values of damping effectiveness for a greater range of $\omega_d$ values. This highlights the fact that the effectiveness of vibration absorber 10 in reducing vibration can also be ensured by modulating the damping characteristics of said absorber. This can be done, for example, by applying damping coatings, or other treatments able to increase the damping of the vibration absorber, where damping is defined as any dissipative process of the vibration energy. However, it should be understood that in some embodiments, friction and additional damping may or may not be present or effective simultaneously. However, the many of the benefits of the present teachings can be achieved as long as one of these two forms of energy dissipation is present.

The effect of the connection stiffness $k_{c1}$, which indirectly affects the proportional damping in the connection between the IBR and damper, is analyzed as well. For each line in FIG. 39 a different value of $k_{c1}$ is considered for which the damper is tuned to the targeted frequency $\omega_d=\omega_t$. Hence, the ratio of $k_{c1}/k_{d1}$ (which is equal to $k_{c1}/k_{s1}$) is different for each case. When considering imperfect tuning, the damper stiffnesses are multiplied by the same factor for some value of $\omega_d$, and the ratios of the stiffness values remain unaltered. The same frequency range as in FIG. 38 is considered to calculate the damper effectiveness. As seen in FIG. 39 when $k_{c1}$ (and consequently $k_{c1}/k_{d1}$) is very low, the dynamics is equivalent to the damper not being connected to the IBR, and the effectiveness is identically 1. As $k_{c1}$ increases, the damping effectiveness and robustness to improper tuning increase in the parameter range analyzed. It may also be observed that as $k_{c1}$ increases the maximum damping effectiveness shifts away from tuning $$\frac{\omega_d}{\omega_t} = 1$$

to a slightly higher value. The nominal parameter value of $k_{c1}$ lies in this region and hence, the maximal effectiveness in FIG. 38 is also achieved when $\omega_d$ is slightly larger than $\omega_t$. This difference from the single-DOF analysis arises due to the dynamics of the multi-DOF system being analyzed here, where damping is not perfectly proportional, but different components of the system have different values of proportional damping. Consequently, multiple modes with different damping values affect the response and the parameter values for perfect tuning are close to the single-DOF case but not exactly the same.

The effect of the damper location was also analyzed with an alternate LMM shown in FIG. 33, where the damper is attached to the blade (at $m_{b1}$) in contrast to the baseline LMM where it is attached to the disk (at $m_{r1}$). The targeted IBR mode and the constrained damper frequencies remain the same in this case. Hence, a damper with nominal parameters is a perfectly tuned damper. The corresponding frequency versus number of NDs plot for this case is shown in FIG. 40 and may be compared to that of the baseline LMM in FIG. 35. It may be seen that with the alternate damper location, where the vibration absorber is attached at a location where the IBR-alone response is higher, the frequency split in the augmented system is greater. Consequently, the response at the targeted frequency is much lower as well. Unfortunately, in practice, it is not feasible to design a damper attachment at the blades, due to the high forces and stresses involved. Hence, the baseline LMM studied here analyzes connection at the disk where stresses are much lower. In general, it is desirable to have more motion at the attachment DOF along the targeted mode for energy transfer to the damper. Another effect of choosing such a blade DOF for damper attachment may be observed in FIG. 41. For the baseline LMM there is little variation in the spatial response coherencies of the blade motion near the targeted frequency between the IBR-alone system and the augmented system. However, in the case of the alternate damper location, the shape of the blade motion changes significantly due to the introduction of the damper.

The mistuning parameters applied to the blades ($\delta_{b,n}$) and the damper ($\delta_{d,n}$) at the $n^{th}$ sector follow a Gaussian distribution with a mean of 1 and standard deviations $\sigma_b$ and $\sigma_d$ respectively, and may be generated as follows:

$$\delta_{b,n}=1+\sigma_b p_n; \delta_{d,n}=1+\sigma_d p_n \quad (13)$$

Where $p_n$ is randomly chosen from a Gaussian distribution with 0 mean and unit standard deviation. Two randomly generated patterns (labeled I and II) are shown in FIG. 42. FIGS. 43-45 show peak responses over all blades to an EO 4 excitation of unit magnitude, for LMMs where pattern I and II were used to generate mistuning parameters for the blades and the damper respectively. In FIG. 43 only the damper is mistuned ($\sigma_b$=0%; $\sigma_d$=5%), FIG. 44 only the blades are mistuned ($\sigma_b$=5%; $\sigma_d$=0%), and both are mistuned in FIG. 45 ($\sigma_b$=5%; $\sigma_d$=5%). It may be seen that for these parameters, small stiffness mistuning does change the damper effectiveness (compare with the tuned case in FIG. 36) with increased response of the augmented system near the second peak. However, the damper is still effective when there is small stiffness mistuning in the blades as well as the damper, which suggests some degree of robustness to unintentional mistuning.

Different patterns and levels (standard deviation) of mistuning have different effects on both the IBR-alone and the augmented system response. Consequently, the damper effectiveness, which is a ratio of these two quantities, will change. This effect was studied by analyzing damper effectiveness at various mistuning levels of the damper and blade, and the results are shown in FIGS. 46-47. The mistuning patterns used in FIG. 46 are the same as those in FIGS. 43-45. The patterns used for mistuning the damper and blades were swapped in FIG. 47. In both cases, the mistuning level in the IBR has a more pronounced effect on the damper effectiveness than the mistuning level in the damper. The damper effectiveness is high for the tuned cases, and decreases for very small levels of blade mistuning ($\sigma_b$=1% approx.), but then increases for higher levels of blade mistuning. Only for very large levels of blade mistuning ($\sigma_b$=10% approx.) the damper stops being effective. The topology of the damper effectiveness plot is different for different specific mistuning patterns in the blades and damper with two local maxima seen in FIG. 46 and three in FIG. 47. This suggests that determining the worst or best mistuning pattern for damper effectiveness would require a probabilistic analysis for the specific model and geometry being considered. Intentional mistuning to achieve a desirable damper effectiveness might also be feasible.

In cyclic symmetric systems such as the tuned LMM, blade dominated modes are in a high modal density region. Consequently, the mistuned modes are linear combinations of these modes and have more than a single nodal diameter component. This implies that both the damper and the blades will have motion for EO excitations other than the dominant NDs of the tuned modes. If there is sufficient motion and energy transfer to the damper, it may exhibit vibration absorption for other EO excitations than the dominant ND of its tuned mode. One such case is shown in FIG. 48 which plots the response of the same system as in FIG. 45 (tuned for vibration absorption under EO 4 excitation), to an EO 7 excitation. It may be seen that the augmented system response is lower at many peaks compared to the IBR-alone response.

Another case of mistuning simulated for this study, aims to determine the effect of high mistuning in a single sector of the damper. This is of interest because similar effects might be exhibited by several practical damper designs. For instance, ring dampers incorporate a small circumferential gap to allow centrifugal effects to deform the damper and maintain contact with the IBR. The large mistuning is modeled by making the $N^{th}$ damper sector half as stiff as others ($\delta_{d,N}$=0.5). The rest of the model is identical to the tuned system ($\delta_{d,n}$=1, $\forall n \neq N$; $\delta_{b,n}$=1, $\forall n$). The response of the augmented system is shown in FIG. 49. It is seen that this type of mistuning alters the number of prominent peaks in the blade response that corresponds to different localization patterns at different frequencies. In conjunction with other mistuning effects, this leads to more complex IBR dynamics, and is a significant effect which should be considered during design of a vibration absorption based damper.

In this invention, the feasibility of the application of vibration absorption based dampers to cyclic symmetric structures such as IBRs was investigated using simplified lumped mass models. The damper was tuned to behave as a vibration absorber to reduce vibration amplitudes in the degrees of freedom corresponding to the blades of the IBR, near a targeted frequency, and in response to a given engine order excitation. Tuning of the damper was achieved by changing stiffnesses in the constrained damper to match one of the natural frequencies of a mode of the damper with the target frequency. It was found that in the case of a cyclic symmetric structure, the damper was effective when the nodal diameter of the tuned damper mode was same as that of the targeted IBR mode or the engine order of the excitation. In this case, the motion at the blades was reduced due to transfer of energy to the damper.

The sensitivity of the damper effectiveness to the damping in the damper degrees of freedom and the stiffness of the connection between the damper and IBR were also explored. It was found that the maximum effectiveness of the damper is non-monotonic as it increases and then decreases with an increase in damping. The damper also becomes more robust to errors in the tuning process for higher damping. While linear proportional damping was analyzed in this paper, the trends are dictated by the location at which this damping was applied and its relative magnitude to the damping in the blades. Consequently, this analysis should also provide some insights when other damping sources such as frictional damping are used. The robustness of the tuning process and the damping effectiveness was found to increase with an increase in the stiffness of the connection between the damper and the IBR. In practical designs, this stiffness might represent some designed mechanical connection where the equivalent parameter value may be altered by design. The damper might also be in direct contact with the IBR, in which case the connection stiffnesses would correspond to the contact parameters in the operational condition, where the designer may only control them indirectly through material selection and designing microslip level through preloads.

An alternate damper attachment where it is directly attached to the blades was also explored. The damper was much more effective in this case. However, in practice, such a design might not be feasible due to large stresses which would occur in thin structures such as blades if damping masses are attached to them.

The effect of small stiffness mistuning in both the damper and the blades, on the damper effectiveness was analyzed. It was found that the effectiveness is much more sensitive to blade mistuning than damper mistuning at the same level. It was found also that the damper effectiveness is not maximum for the tuned case. The levels of mistuning at which the maximum is encountered depends on the specific mistuning patterns in the damper and IBR. This suggests that probabilistic analysis would be necessary to determine the ideal mistuning parameters if intentional mistuning was used or to find the worst-case scenario for damper effectiveness if only unintentional mistuning is considered. It was also found that in the mistuned case, it was possible for a damper tuned for a specific engine order of excitation to be effective for other engine orders. The specific engine orders that the damper is effective at will depend on the mistuning patterns and the corresponding nodal diameters of the modes of the combined IBR and damper in the frequency region of interest. However, this invention shows that it is possible to design an effective damper which offers vibration absorption for multiple IBR modes. The effect of large mistuning in a single sector of the damper was also studied to understand the dynamic behavior for dampers which are structurally similar and might be tuned as vibration absorbers such as ring dampers with circumferential gaps. It was found that such localized large mistuning, present in a relatively small mass such as the damper, can have a significant effect on the IBR response and should not be ignored during analysis if present.

This invention demonstrates the feasibility of application of the vibration absorber based concept to IBR dampers. A wide variety of designs are possible with this concept, where different structures in the absorber may be designed to control the various parameters explored here. It might also be possible to combine this concept with other commonly used damping mechanisms such as Coulomb friction or impulse dampers. The salient trends established in this invention demonstrate that the most important factor to consider when designing such dampers is the optimal parameter region for the energy transfer mechanism to the damper, where the damping is not high enough to deter transfer but also not so low that it prevents significant dissipation. Possible mistuning in the damper is also a significant effect and must be considered alongside blade mistuning.

Herein, another example of the application of the concepts used in this invention is presented. First, the working principle and expected outcome of the application of the method are presented. Frictional nonlinearities and contact conditions are then introduced. Finally, the procedure used to ensure a match between the natural frequencies of the IBR targeted modes and the damper modes is presented. The IBR considered in this invention is tuned, i.e. it does not have any sort of mistuning or deviation from nominal properties.

A simple lumped-mass representation of the tuned vibration absorber concept is presented in FIG. 27, where a single-DOF vibration absorber is attached to a single-DOF main system. A comparatively small mass m is attached to the main mass M by means of a spring k to reduce the vibration amplitude of the original mass M. The qualitative trends shown in FIG. 27 represent the behavior of a single-DOF system in the presence of a vibration absorber. In general, the added mass m does not substantially affect the behavior of the system, as described by the dashed line. It was shown that for the simple of an undamped oscillator it is possible to significantly reduce the vibration response of the mass M at its natural frequency by adding a tuned vibration absorber having the same natural frequency, i.e. satisfying $$\sqrt{\frac{K}{M}} = \sqrt{\frac{k}{m}}.$$

With a tuned vibration absorber, the response in shown with a dashed-dotted line is obtained, where a shift in the natural frequencies of the system can be observed. It is important to mention that the amplitude of motion of the damper increases as a result of tuning. Energy can be dissipated by introducing a Coulomb friction elements between the two masses, with a result qualitatively similar to the double dashed line of FIG. 27, where the vibration amplitude is reduced. This concept is extended to a realistic multi-DOF system with a multi-DOF damper in the following section.

The equations of motion (EOMs) for an IBR hosting a ring damper can be written in general form as $$M\ddot{x}+C\dot{x}+Kx=f_e+f_n(\dot{x},x), \quad (14)$$

Where M, C and K are the mass, damping, and stiffness matrices obtained in the absence of contacts, $f_e$ is the vector of external periodic forces acting on the structure, and x is the vector of generalized coordinates. The vector $f_n$ represents the nonlinear forces, which are due to the contacts between the damper and the IBR. Proportional damping is used, and the damping matrix can be written as $C=\beta K$. The mass and stiffness matrices can be written as $$M = \begin{bmatrix} M_b & 0 \\ 0 & M_d \end{bmatrix}, K = \begin{bmatrix} K_b & 0 \\ 0 & K_d \end{bmatrix}, \quad (15)$$

Where the subscripts b and d refer to the IBR and the damper components respectively. Having obtained the matrices K and M without considering contacts, the connectivity between the two bodies is enforced through the forcing term $f_n$.

A relative coordinate formulation is used to describe the displacement at the contact interface. Thus, the DOFs must be rendered, and a coordinate transformation $x=Tx_r$ between the original coordinates in x and the relative coordinates in $x_r$ be applied. The relative coordinates can be partitioned as $$x_r = \begin{bmatrix} x_2 - x_1 \\ x_1 \\ x_0 \end{bmatrix}, \quad (16)$$

Where $x_1$ contains the contact DOFs on the IBR groove, $x_2$ contains the contact DOFs on the damper, and $x_0$ contains all the remaining DOFs. The DOFs in $x_0$ are not directly affected by non-linearities, thus the displacement vector $x_r$ and the corresponding forcing vector $f_{nr}$ can be partitioned as $$x_r = \begin{bmatrix} x_n \\ x_0 \end{bmatrix}, f_{nr} = \begin{bmatrix} f_{nr,c} \\ 0 \end{bmatrix}, \quad (17)$$

Where $x_n$ and $f_{nr,c}$ contain all the DOFs affected by nonlinearities, i.e. the ones belonging to $x_1$ and $x_2$. A node-to-node contact model is used, where all pairs of nodes having coincident location form a contact pair. The sets of DOFs $x_1$ and $x_2$ presented in Eq. 16 contain such contact pairs. The 1D contact model is used to model the interaction between disk and damper.

Let us define a local coordinate system at each contact node pair, in which z represents the normal direction, and x, y represent the tangential directions. For the node i the tangential contact stiffness $k_{i,x}$, $k_{i,y}$ and normal contact stiffness are represented by 1D springs. Let us call $N_i(t)$ the normal contact force at the node pair i, and $v_i$ the normal relative displacement, which is positive when the surfaces penetrate each other. The contact force $N_i(t)$ can be defined as $$N_i(t) = \max(k_{i,z} \cdot v_i(t), 0), \quad (18)$$

Which is thus positive when there is contact and zero in separation. The prestress $N_{i,z0}$ that is applied to the contact node pairs to ensure contact in static condition is implicitly included in Eq. 18 because the term $v_i(t)$ contains the static solution. Let us define $w_{i,x}$ and $w_{i,y}$ as the tangential slip between the contact surfaces and $u_{i,x}$ and $u_{i,y}$ as the relative displacements in the tangential directions. The tangential force $T_{i,x}(t)$ is defined as $$\begin{cases} T_{i,x}(t) = k_{i,x} \cdot (u_{i,x}(t) - w_{i,x}(t)), & \text{stick} \\ T_{i,x}(t) = \mu N_i(t) \cdot \text{sign}(\dot{w}_{i,x}(t)), & \text{slip} \\ T_{i,x}(t) = 0 & \text{separation} \end{cases} \quad (19)$$

Where $\mu$ is the friction coefficient. $T_{i,y}(t)$ is similarly defined by changing the subscript x to y. A more detailed explanation of this contact model can be found. The contact status can be slip, stick, or separation. The contact condition must be calculated at every t and for every node location. Separation occurs when the two nodes are not in contact, i.e. there is a gap between the two surfaces. Both slip and stick conditions occur when there is contact between the contact surfaces. If $N_1(t)$ is positive, there are two possible states for the contact. If the tangential force $T_{i,x}(t)$ or $T_{i,y}(t)$ calculated for the stuck case is larger than the product $\mu N_i(t)$, where $\mu$ is the coefficient of friction, the contact is in slip condition, otherwise it is stuck. This may happen in any direction x or y. Stuck conditions do not imply that there is no relative motion $x_2-x_1$, but rather that $w_{i,x}(t)$ or $w_{i,y}(t)$ remain constant. As a result, the node pair is effectively connected by a linear spring in the corresponding direction. At any time t, the contact condition must be evaluated, and the corresponding forcing term $f_n$ must be applied. This makes Eq. 14 highly nonlinear, resulting in a significant computational cost associated with its solution. It is important to notice that the contact condition only depends on the relative motion $x_2-x_1$ between the damper and the IBR.

To increase computational efficiency, Craig-Bampton component mode synthesis is used to reduce the number of linear DOFs. Only the contact nodes on the IBR and the entire set of damper nodes are preserved as master nodes, and the corresponding set of slave modes is calculated. This ROM is used to assess the effectiveness of the proposed damper concept. Eq. 14 is solved using the harmonic balance method to obtain the steady state response to a traveling wave excitation. The combination of CB-CMS and HBM is used to substantially reduce the time required for the solution of the EOMs.

The damper used in this invention is shown FIG. 50. Note that it presents a gap that makes it non-axisymmetric. The presence of the gap serves two purposes. The first one is to ensure preload at the contact interface. Centrifugal forces cause the damper to deform substantially in the radial direction, which is possible thanks to the gap. As a result contact at the interface between the damper and the IBR groove is ensured. The static equilibrium would be different if the damper was perfectly axisymmetric, with possible loss of contact or inadequate preload. Secondly, the damper becomes mistuned, i.e. non-axisymmetric, due to the presence of the gap. This results in its normal modes being mistuned. If a spatial Fourier analysis is carried out for any damper mode it would be possible to observe multiple spatial harmonics, or nodal diameter contributions. This is particularly convenient, because it allows the damper to couple with multiple IBR modes with various nodal diameters. Previous studies showed that the coupling is not possible if the system is tuned, where only few nodal diameters can be used. Damper mistuning is thus beneficial because it allows to tune damper modes for multiple IBR nodal diameters. The damper position in the IBR groove is shown in FIG. 26. For this study, it is assumed that there is clearance between the sides of the damper and of the groove.

The damper matrices presented in Eq. 15 are obtained for the free damper, i.e. a damper that is not constrained to the groove because the contacts and constraints are introduced using the nonlinear forcing term. To apply the concept of a tuned vibration absorber, it is necessary to tune the damper, i.e. to ensure that one of its natural frequencies matches the IBR frequency to be damped for the tuning of the damper, appropriate boundary conditions and contact conditions must be enforced. The stuck natural frequencies of the damper are used for tuning. The reason why stuck contact conditions were chosen is that the nonlinear response is expected to lie close to the linear stuck response until microslip phenomena appear. Based on previous literature, a small shift in peak frequency of the response could also occur. The stuck natural frequencies are obtained by considering the contact node pairs in stuck conditions, i.e. connected by linear springs in all three directions. To calculate such frequencies, the IBR nodes are assumed to be fixed. Once the IBR alone natural frequencies are known, an undamped modal analysis is carried out on the constrained damper. The constrained damper mass matrix $M_d$ does not change based on contact conditions. The stuck stiffness matrix $K_{d,c}$ used for tuning purposes is instead dependent on the contact conditions, and it can be written as $$K_{d,c} = K_d \Delta K_d, \quad (20)$$

Where $\Delta K_d$ is the matrix that enforces the presence of linear springs between the contact pairs to simulate a stuck contact and $K_d$ is the matrix obtained without contacts. $\Delta K_d$ has simple diagonal form because a relative coordinate system is used, as shown in Eq. 20. Thus, $$\Delta K_d = \mathrm{diag}(k_{1,x}, k_{1,y}, k_{1,z}, \ldots, k_{i,x}, k_{i,y}, k_{i,z}, 0, 0, 0, \ldots), \quad (21)$$

Which is populated with the nodal contact stiffnesses in the contact DOFs, and zero elsewhere. Once the stiffness matrix $K_{d,c}$ is obtained, it is possible to study the natural frequencies and normal modes of the damper. The eigenvalue problem can be written as $$K_{d,c}\phi = M_d \phi \Lambda_{d,c}, \quad (22)$$

Where $\phi$ is a matrix whose columns represent the normal modes of the system, and $\Lambda_{d,c} = \mathrm{diag}(\omega_1^2, \ldots, \omega_n^2)$ is a diagonal matrix containing the eigenvalues. Please note that the contact parameters have a significant impact on the tuned damper frequencies and their estimation can be particularly challenging. Studies on the identification of contact stiffness parameters can be found.

Once the targeted mode of the IBR is chosen, its frequency $\Omega_t$ is known. The IBR natural frequency $\Omega_t$ is obtained considering the IBR alone without the damper attached, similar to what is done for the lumped mass example shown in FIG. 27. In order for this damper to behave as a tuned vibration absorber, the frequency $\omega_i = \Omega_t$ must be identified. If there is no such frequency $\omega_i$ the frequency match can be obtained by means of geometric design and material changes. As a proof of concept, in this study the material properties of the damper were changed to ensure that there exists a value i for which $\omega_i = \Omega_t$.

The methods presented in the previous section are applied to the case of an academic IBR with N=24 blades. The IBR used in the simulation is presented in FIG. 1A. The full wheel finite element model of the IBR comprises 51,240 nodes and 44,424 elements. The damper is comprised of 1,008 nodes and 334 elements. Due to the fact that only the contact nodes at the interface between IBR and damper present nonlinearity, CB-CMS can be used to reduce the other DOFs of the system. All 1,008 nodes of the damper finite element model were preserved. This resulted in a damper model having 3,024 DOFs. For the IBR, only the interface nodes and two nodes per blade located at the blade tip were preserved. The blade tip nodes are used to apply the traveling wave excitation to the blades and to measure their response, and they are shown in FIG. 1A. There are 840 interface nodes, and 48 blade nodes. There were 500 slave modes retained in the CB-CMS analysis, resulting in an IBR model with 3,164 DOFs. The number of DOFs of the entire assembly is thus 6,188. There are 504 interface nodes affected by the frictional nonlinearities, the others being side nodes considered to be always, in separation in this study. The same contact preload $N_{i,z0}$ is uniformly applied at all nodes. Parameter $$\mu \frac{\Sigma_i N_{i,z0}}{F}$$

(where F is the forcing amplitude) is of interest because it was used in previous studies and it captures the level of microslip present in the system. For the results shown in this invention, we used $$\mu \frac{\Sigma_i N_{i,z0}}{F} = 10^4.$$

In this invention, the IBR is tuned, and the only source of mistuning is the damper gap. The lowest natural frequencies of the damper before tuning are presented in FIG. 51. Note the high modal density of the damper. FIG. 52 shows the frequency-nodal diameter plot of the IBR and the tuned damper frequencies ordered by mode index. The IBR mode targeted in this invention belongs to the 1st family, ND=5. Such a mode was chosen to validate the concept proposed here because previous studies showed that traditional ring dampers effectiveness is low for blade dominated modes having low disk motion. In contrast, the ring damper concept proposed here is effective in those conditions. The frequency of the IBR targeted mode is f=2,112.8 Hz, and the 10th damper mode is chosen to damp it. The damper is tuned by adjusting its material properties. Note the frequency overlap at the crossing between the two series of results shown in FIG. 52. The purpose of choosing the 10th mode is to highlight that the proposed concept is robust and effective even in cases where the IBR nodal diameter to be amped is not dominant in the correspondent damper mode. The 10th mode contains all nodal diameters, but ND=5 of the mode to be damped is not dominant. There is no need to match the nodal diameter with the one of the targeted IBR mode because the damper is mistuned. However, it is important to ensure that the corresponding nodal diameter content of the damper mode is sufficiently large. First, a spatial Fourier Transform of the nodal displacements of a set of given nodes (one per each sector) along a chosen direction is carried out. The coefficients obtained from such analysis represent the participation factors of different spatial harmonics, which constitute the nodal diameter content of the mistuned mode. The nodal diameter content of the damper mode used for tuning purposes is shown in FIG. 53. Note that the chosen mode does not have its maximum nodal diameter component at ND=5. However, the chosen mode has a relatively large ND=5 component.

To evaluate the effectiveness of the proposed damper concept, a forced response analysis is carried out. An E0=5 traveling wave excitation is applied to the IBR. Forcing is applied on a blade node for each sector of the IBR in the axial direction. The forcing level and the prestress forces are kept constant in this study. Only the type of ring damper used is varied.

First, the linear response is calculated for both the IBR with a tuned damper and the IBR with a non-tuned damper. The non-tuned damper is defined as a damper that does not have at least a natural frequency matching the natural frequency of the targeted IBR mode. The linear response is calculated in stuck conditions because that is the typical condition that can be found when frictional nonlinearities are not activated. Then, a nonlinear analysis is carried out to investigate the effects of the tuned damper and of the non-tuned damper. The tuned damper is expected to operate in the microslip regime, i.e. a contact condition in which contact nodes exist in both stuck slip conditions. The results are presented in FIGS. 54-55. Four sets of data are presented, two linear and two nonlinear. The response is calculated by taking the maximum amplitude over all blades in the axial direction.

The linear response in stuck conditions for the non-tuned damper is presented in FIG. 54. Note that the nonlinear results almost perfectly overlap with the linear response, which means that nonlinearities are not activated and the system is in stuck conditions and not in microslip. Activation or lack of activation of nonlinearities depends on the preload, friction and forcing conditions. Limited to the case we studied, we can conclude that in the simulated conditions of preload, friction, and forcing, a traditional ring damper is ineffective, providing no amplitude reduction. When the damper is non-tuned, the frictional nonlinearities are not activated due to the low motion amplitude at the contact, and thus there is no energy dissipation.

The results obtained with a tuned damper are presented in FIG. 55. Note that in the tuned case there is a substantial frequency split and that many peaks are present even in the linear case. The presence of multiple peaks is due to the presence of mistuning in the damper. Several small resonance peaks that were not present for the non-tuned damper can be observed within the frequency range, due to the high modal density of the damper, as it can be seen from FIG. 51. Even though there is an amplitude change compared to the linear results obtained with a non-tuned damper, this change is not substantial, as there is no significant variation of linear damping due to the use of a tuned absorber. The nonlinear results obtained using a tuned damper show instead a significant variation compared to both linear cases. Due to the simultaneous effects of friction nonlinearity and tuned damper absorber, the vibration amplitude of the blades is significantly reduced. Significant amplitude reduction can be seen in the areas corresponding to the linear resonance. Close to the linear resonance the damper motion is increased, and this results in large relative motion. As a result, slip occurs at some of the contact node pairs and energy dissipation is enabled. The maximum blade vibration amplitude obtained with the tuned damper is 0.14. When a traditional damper is used, the blade vibration amplitude is 1.27, which means that a 90% reduction can be achieved using this damper concept. FIGS. 54-55 were obtained by using the maximum vibration amplitude over all the blades. More information about mistuning effects may be obtained by studying individual blade responses. In FIG. 56, the nonlinear results presented in FIG. 55 are plotted for each blade. The blades presented different vibration amplitudes. In general, multiple peaks appear in the response because the peak amplitudes of each blade are at distinct frequencies. This effect is mitigated by nonlinearities. Note in FIG. 56 that the simultaneous presence of nonlinearities and mistuning causes only relatively small amplitude variation between blades near the main peaks.

To analyze the origin of energy dissipation, the motion of the damper is examined. FIGS. 57-58 show the amplitude of the damper motion at the contact interface for both the tuned and the non-tuned dampers. It is possible to observe that the motion of the damper is much larger in the tuned case, even though the blade amplitude is lower. This confirms the expected increased motion due to energy transfer. Furthermore, the peaks of the response shown in FIG. 57 are cut by the effects of nonlinearities, i.e. the damper shows the same behavior of the IBR blades, and both of them show signs of microslip in the same frequency range. The increased motion is shown for the axial direction because a damper mode with dominant motion along that direction was chose and because of the presence of clearance between the damper sides and the IBR groove.

The effects of frictional nonlinearities can be examined by comparing linear and nonlinear results for the case of a perfectly tuned damper. However, in real applications it is impossible to achieve a perfect match between damper and IBR frequencies due to geometric and material tolerances. In this section, a sensitivity analysis based on the variation of natural frequency of the damper is carried out to examine the effects of detuning on damper effectiveness. The analysis is carried out to shed light onto the energy transfer and dissipation mechanisms in the system. The targeted mode frequency is the same as before, i.e. 2,112.8 Hz or 52.2 Hz above the original target frequency, which is equivalent to a 1.0% or 2.5% frequency variation. The damper frequencies are now outside the frequency range examined in the forced responses in FIGS. 54-58. However, the improperly tuned damper is expected to have a diminished but non-zero effect on the IBR response due to the fact that its frequencies are relatively close to those of the IBR. A larger damper motion is expected for the tuned damper compared to the non-tuned damper. This results in larger relative motion at the interface between IBR and damper, which in turn, causes more energy dissipation and thus lower blade vibration amplitudes.

From FIG. 59 it is possible to notice that the nonlinear results present a significant deviation from the ones obtained in the perfectly tuned case of FIG. 55. The frequency split that was observed before is not present anymore. Even if the frequency split and the mistuning are now not as visible as before, the non-linear calculations showed a significant amplitude reduction, as well as a minor frequency shift. Both the frequency shift and the amplitude reduction are consistent with what was expected. This confirms the robustness of the approach.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vibration absorber damper for a rotatable structure which is nominally cyclic symmetric, the cyclic symmetric structure having a hub portion having a rotational axis and a plurality of radial members radially extending from the hub portion, the hub portion having a groove extending circumferentially about the rotational axis, the groove being positioned proximal to the rotational axis relative to the plurality of radial members, the vibrational absorber damper comprising:
 a ring member having:
  a plurality of repetitive cellular structures each defining a hollow interior section, each of the plurality of repetitive cellular structures having a distal wall, a proximal wall, and a pair of sidewalls interconnecting the distal wall with the proximal wall to form the hollow interior section; and
  a plurality of deformable members each extending from the ring member and disposed in a corresponding one of the plurality of repetitive cellular structures, each of the plurality of deformable members configured to interact with the nominally cyclic symmetric structure to damp vibration thereof, each of the plurality of deformable members having a first stiffness in a radial direction relative to the rotational axis and a second stiffness in a direction orthogonal to the radial direction, the second stiffness being less than the first stiffness, at least one of the plurality of deformable members having an elongated portion having a first end extending from one of the distal wall, the proximal wall, and the pair of sidewalls, the at least one of the plurality of deformable members having an enlarged portion disposed on a second end of the elongated portion opposite the first end, the enlarged portion is shaped to complement at least one of the distal wall, the proximal wall, and the pair of sidewalls to limit movement of the deformable member in response to application of a force, the enlarged portion having a central valley opposing a protrusion formed in at least one of the distal wall, the proximal wall, and the pair of sidewalls.

2. The vibration absorber damper according to claim 1 wherein the enlarged portion is sized to be spaced apart from the distal wall, the proximal wall, and the pair of sidewalls prior to application of a force and to contact at least one of the distal wall, the proximal wall, and the pair of sidewalls in response to force applied by centrifugal loading, prestress, active materials, or a combination thereof.

3. The vibration absorber damper according to claim 1 wherein the enlarged portion is sized to be spaced apart from the distal wall, the proximal wall, and the pair of sidewalls prior to application of a force and to frictionally engage at least one of the distal wall, the proximal wall, and the pair of sidewalls in response to the application of force.

4. The vibration absorber damper according to claim 1 wherein the enlarged portion is shaped to selectively contact at least one of the distal wall, the proximal wall, and the pair of sidewalls in response to application of a force.

5. The vibration absorber damper according to claim 1, further comprising a plurality of finger members radially extending and configured to frictionally engage the nominally cyclic symmetric structure.

6. The vibration absorber damper according to claim 1 wherein at least one of the plurality of deformable members comprises a coating.

7. The vibration absorber damper according to claim 1 wherein a first of the plurality of repetitive cellular structures is configured to define a vibrational response that is different from a second of the plurality of repetitive cellular structures.

8. The vibration absorber damper according to claim 1 wherein the plurality of repetitive cellular structures is configured as two or more circumferential rows.

9. The vibration absorber damper according to claim 8 wherein a first of the circumferential rows is positioned in a side-by-side arrangement relative to a second of the circumferential rows.

10. The vibration absorber damper according to claim 8 wherein a first of the circumferential rows is positioned in a concentric arrangement relative to a second of the circumferential rows.

11. A method of dissipating vibrational energy of a rotatable structure which is nominally cyclic symmetric, the nominally cyclic symmetric structure having a hub portion having a rotational axis and a plurality of radial members radially extending from the hub portion, the hub portions having a groove extending circumferentially about the rotational axis, the groove being positioned proximal to the rotational axis relative to the plurality of radial members, the method comprising:
positioning a ring member in the groove of the nominally cyclic symmetric structure, the ring member having:
a plurality of repetitive cellular structures each defining a hollow interior section, each of the plurality of repetitive cellular structures having a distal wall, a proximal wall, and a pair of sidewalls interconnecting the distal wall with the proximal wall to form the hollow interior section; and
a plurality of deformable members each extending from the ring member and disposed in a corresponding one of the plurality of repetitive cellular structures, at least one of the plurality of deformable members having an elongated portion having a first end extending from one of the distal wall, the proximal wall, and the pair of sidewalls, the at least one of the plurality of deformable members having an enlarged portion disposed on a second end of the elongated portion opposite the first end, the enlarged portion is shaped to complement at least one of the distal wall, the proximal wall, and the pair of sidewalls to limit movement of the deformable member in response to application of a force, the enlarged portion having a central valley opposing a protrusion formed in at least one of the distal wall, the proximal wall, and the pair of sidewalls;
dissipating energy by surface or point impacts of the plurality of deformable members.

12. The method according to claim 11 further comprising:
modulating a contact force between the ring member and the nominally cyclic symmetric structure using centrifugal loads acting at a contact interface there between to optimize vibration reduction.

13. The method according to claim 12 wherein the modulating a contact force between the ring member and the nominally cyclic symmetric structure comprises modulating a contact force between the ring member and the nominally cyclic symmetric structure using a frictional interface there between.

* * * * *